(12) United States Patent
Yoshino

(10) Patent No.: US 12,388,172 B2
(45) Date of Patent: Aug. 12, 2025

(54) ANTENNA DEVICE, RECTIFIER CIRCUIT, AND ELECTRONIC DEVICE

(71) Applicant: SONY SEMICONDUCTOR SOLUTIONS CORPORATION, Kanagawa (JP)

(72) Inventor: Yoshitaka Yoshino, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 35 days.

(21) Appl. No.: 18/001,702

(22) PCT Filed: Apr. 28, 2021

(86) PCT No.: PCT/JP2021/016925
§ 371 (c)(1),
(2) Date: Dec. 13, 2022

(87) PCT Pub. No.: WO2021/261076
PCT Pub. Date: Dec. 30, 2021

(65) Prior Publication Data
US 2023/0238691 A1     Jul. 27, 2023

(30) Foreign Application Priority Data
Jun. 22, 2020   (JP) .................................. 2020-107199

(51) Int. Cl.
*H01Q 1/24* (2006.01)
*H01Q 1/38* (2006.01)
*H04B 3/56* (2006.01)

(52) U.S. Cl.
CPC ............... *H01Q 1/38* (2013.01); *H01Q 1/248* (2013.01); *H04B 3/56* (2013.01)

(58) Field of Classification Search
CPC .......... H01Q 1/38; H01Q 1/246; H01Q 1/248; H04B 3/56; H02J 50/001; H02J 50/005; H02J 50/27
See application file for complete search history.

(56) References Cited

U.S. PATENT DOCUMENTS

2006/0141944 A1 * 6/2006 Shibagaki .............. H04B 1/006
                                                         455/78
2011/0012809 A1 * 1/2011 Cho .................. G06K 19/07749
                                                         977/932

(Continued)

FOREIGN PATENT DOCUMENTS

EP           3654489 A2     5/2020
EP           1263114 A2     12/2022

(Continued)

OTHER PUBLICATIONS

International Search Report and Written Opinion prepared by the Japan Patent Office on Jul. 1, 2021, for International Application No. PCT/JP2021/016925, 2 pgs.

(Continued)

*Primary Examiner* — David E Lotter
(74) *Attorney, Agent, or Firm* — Sheridan Ross PC

(57) ABSTRACT

Provided is an antenna device including an antenna unit including a rectifier circuit that receives electric field energy of a radio wave or a quasi-electrostatic field (near field) in a space and rectifies an AC signal into a direct current, the antenna unit including a first antenna element that is a conductor to be in contact with or connected to an industrial product metal portion and a second antenna element that is a conductor different from the first antenna element and provided not to be electrically connected to the industrial product metal portion, in which an input line output from the first antenna element to a rectifier circuit unit of the AC (Continued)

signal output from the antenna unit is connected to the rectifier circuit.

21 Claims, 40 Drawing Sheets

(56) References Cited

U.S. PATENT DOCUMENTS

| | | | | |
|---|---|---|---|---|
| 2016/0190681 A1* | 6/2016 | Huang | ............ | H01Q 9/42 |
| | | | | 343/848 |
| 2017/0349057 A1* | 12/2017 | Namba | ............ | H02J 7/02 |
| 2020/0295454 A1* | 9/2020 | Yun | ............ | H01Q 1/2283 |

FOREIGN PATENT DOCUMENTS

| | | |
|---|---|---|
| JP | 2003088005 A | 3/2003 |
| JP | 2006-031508 | 2/2006 |
| JP | 2006-186596 | 7/2006 |
| JP | 2011-520171 | 7/2011 |
| JP | 2014-183728 | 9/2014 |
| KR | 20070021947 A | 2/2007 |
| KR | 20150139110 A | 12/2015 |

OTHER PUBLICATIONS

Kitazawa et al., "[Invited Talk] Energy Harvesting from Broadcasting and Cellular Radio Sources," Technical Report of the Institute of Electronics, Information and Communication Engineers, WPT 2013-26, Nov. 2013, pp. 49-54 (with English abstract).

Miyagoshi et al., "Design of a High-Impedance Wideband Folded Dipole Antenna and Reception Power Level for Energy Harvesting Applications," Technical Report of the Institute of Electronics, Information and Communication Engineers, vol. 114, No. 245, 2014, pp. 13-18 (with English abstract).

* cited by examiner

ANTENNA DEVICE, RECTIFIER CIRCUIT, AND ELECTRONIC DEVICE

CROSS REFERENCE TO RELATED APPLICATIONS

This application is a national stage application under 35 U.S.C. 371 and claims the benefit of PCT Application No. PCT/JP2021/016925, having an international filing date of 28 Apr. 2021, which designated the United States, which PCT application claimed the benefit of Japanese Patent Application No. 2020-107199, filed 22 Jun. 2020, the entire disclosures of each of which are incorporated herein by reference.

TECHNICAL FIELD

The present technology relates to an antenna device, a rectifier circuit, and an electronic device having an energy harvesting function.

BACKGROUND ART

Converting energy of radio waves such as broadcast waves and the like present around us into power (energy harvesting) has been considered. In the case of environmental power generation, the current flowing through the antenna to the circuit is rectified into direct current and converted into electric energy. A diode is used to rectify radio waves into direct current. A rectifier circuit-equipped antenna is called a rectenna.

Non-Patent Document 1 describes that a high impedance antenna is used to receive a band of 470 to 600 MHz of digital terrestrial broadcasting, and an excitation voltage of a rectifier is increased to improve efficiency of a rectenna.

Non-Patent Document 2 describes measurement results of power flux densities of V-High multimedia broadcasting (208.5 to 222 MHz), digital terrestrial broadcasting (470 to 710 MHz), and a 800 MHz band mobile phone base station (860 to 890 MHz), and evaluation of an antenna for electromagnetic wave collection.

CITATION LIST

Non-Patent Document

Non-Patent Document 1: "Design of a High-Impedance Wideband Folded Dipole Antenna and Reception Power Level for Energy Harvesting Applications", Hiroshi Miyagoshi, Keisuke Noguchi, Kenji Ito, Jiro Ida, Technical Report of the Institute of Electronics, Information and Communication Engineers Vol. 114, No. 245, pp. 13 to 18

Non Patent Document 2: "[Invited Talk] Energy Harvesting from Broadcasting and Cellular Radio Sources", Shoichi Kitazawa, Hirokazu Kamoda, Hiroshi Ban, Naoya Kukutsu, Kiyoshi Kobayashi, Technical Report of the Institute of Electronics, Information and Communication Engineers WPT 2013-26 (2013-11)

SUMMARY OF THE INVENTION

Problems to be Solved by the Invention

In both of Non-Patent Document 1 and Non-Patent Document 2 described above, only electromagnetic energy of radio waves propagating in the air is targeted, an antenna is designed in accordance with a frequency, and a matching unit for matching impedance is provided. Such a configuration has a problem that reception can be performed only at a matched frequency, and the obtained power is significantly reduced. In particular, an antenna is separately required in accordance with a frequency to be received, and in order to receive a broadcast wave, a size of about ½ of a wavelength is required, and reception efficiency is lowered with a reduced size, so the application range is very limited. That is, in order to receive a wide frequency, a plurality of antennas having a size corresponding to a frequency at which power can be received is required, and the antennas need to be separately installed.

Thus, an object of the present technology is to provide an antenna device, a rectifier circuit, and an electronic device capable of obtaining larger reception power by taking in electric field energy of a quasi-electrostatic field (near field) in addition to a wide range of radio waves with a configuration different from conventional one of converting energy of radio waves using a reception antenna into power.

Solutions to Problems

The present technology is an antenna device including an antenna unit including a rectifier circuit that receives electric field energy of a radio wave or a quasi-electrostatic field (near field) in a space and rectifies an AC signal into a direct current, the antenna unit including a first antenna element that is a conductor to be in contact with or connected to an industrial product metal portion and a second antenna element that is a conductor different from the first antenna element and provided not to be electrically connected to the industrial product metal portion, in which an input line output from the first antenna element to a rectifier circuit unit of the AC signal output from the antenna unit is connected to the rectifier circuit.

MODE FOR CARRYING OUT THE INVENTION

Figure 1:
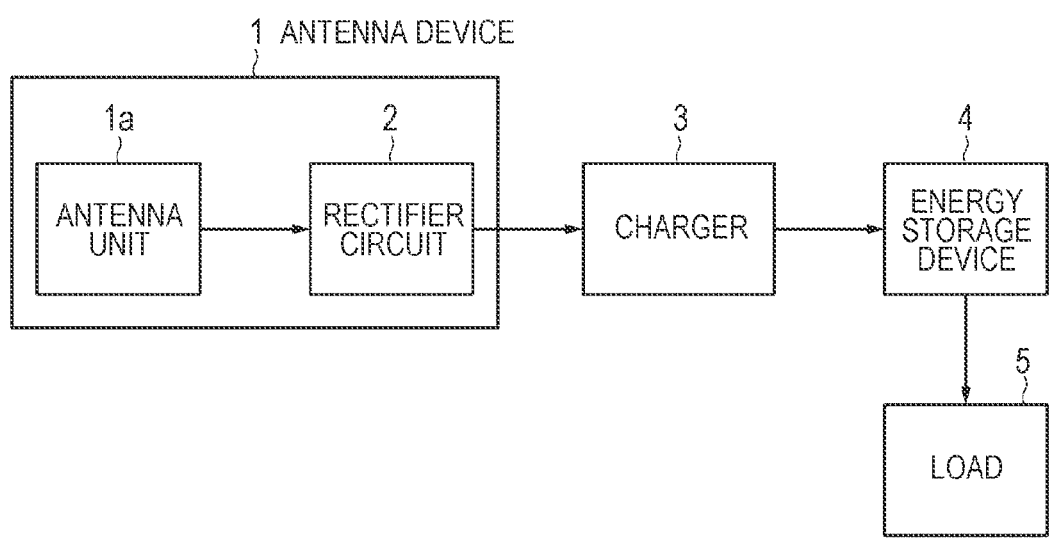
FIG. 1 is a block diagram of an embodiment of a reception device according to the present technology.

The embodiments described below are preferred specific examples of the present technology, and various technically preferable limitations are given. However, the scope of the present technology is not limited to these embodiments unless there is a description to limit the present technology in the following description. Furthermore, in the following description, the same names and reference numerals indicate the same or similar constituent elements, and redundant description will be omitted as appropriate.

The present technology includes a metal portion to which electric field energy is induced, for example, a metal portion (iron, aluminum, copper, metal alloy, or the like) of an industrial product, a car, a vending machine, a refrigerator, a microwave oven, a metal rack, a guardrail, a mail post, a traffic light, and the like existing in the vicinity, and receives electric field energy of radio waves and quasi-electrostatic field (near field) in the space as an antenna. That is, when metal is present in a state of floating in the space, various AC power (AC current) flows on the metal surface. Therefore, this metal is regarded as an antenna, and this power is efficiently converted into energy.

For example, electric field energy is induced in a metal portion (iron, aluminum, copper, metal alloy, etc.) of an industrial product, a car, a vending machine, a refrigerator, a microwave oven, a metal rack, a guardrail, a mail post, a traffic light, or the like existing in the vicinity. The present technology enables reception of electric field energy of radio waves and quasi-electrostatic field (near field) in the space using such an industrial product metal portion as an antenna. That is, when metal is present in a state of floating in the space, various AC power (AC current) flows on the metal surface. Therefore, this metal is regarded as an antenna, and this power is efficiently converted into energy. Note that the industrial product metal portion is a metal portion other than an industrial product designed as an antenna.

In the input terminal portion that is in contact with or connected to the industrial product metal portion and uses the industrial product metal portion itself as an antenna, the impedance for reception is preferably high in connection with the rectifier circuit in the subsequent stage. In particular, the input terminal portion is connected in series without providing a matching circuit according to the frequency, and rectified with a diode having a very small reverse current with respect to the forward current. Therefore, in addition to the conventional radio waves, it is possible to efficiently receive power of a quasi-electrostatic field (near field) which is not a radio wave having a frequency of 50/60 Hz leaking from a very small power supply.

In this manner, it is not necessary to consider the antenna shape between the input terminal portion connected to the industrial product metal portion and the rectifier circuit, and the matching circuit is unnecessary. Therefore, a first method has a structure in which the ground of the antenna device is grounded to the ground of the earth by capacitive coupling or grounded by a cable or the like to generate an electric field, so that it is possible to take in electric field energy in a quasi-electrostatic field other than radio waves. Furthermore, a second method has a structure in which another antenna element different from the ground of the antenna device is grounded to the ground of the earth by capacitive coupling or grounded to the ground by a cable or the like to generate an electric field, so that it is possible to take in electric field energy in a quasi-electrostatic field other than radio waves. That is, power or noise leaking from a power cord or an inverter can be received and converted into energy. The present technology can increase reception power by receiving a wide range of electric field energy. The quasi-electrostatic field is a voltage phenomenon that does not have a property of propagating like a radiated electromagnetic field, a so-called radio wave, and is distributed like electrostatic charging in the vicinity of a human, a vehicle, or a substance. The electrostatic field is regarded as having no time change, whereas the quasi-electrostatic field has a frequency component and has a time change.

FIG. 1 illustrates an embodiment of an antenna device having an energy harvesting function according to the present technology. The electric field energy is received by an antenna unit 1a including a first antenna element and a second antenna element, and the output of the antenna unit 1a is supplied to a rectifier circuit 2. The antenna unit 1a and the rectifier circuit 2 constitute an antenna device 1.

The output of the rectifier circuit 2 is supplied to a charger 3. An energy storage device 4 is connected to the charger 3. The energy storage device 4 is charged by the charger 3. The charger 3 may control the discharge of the energy storage device 4. The antenna device 1, the charger 3, and the energy storage device 4 constitute a reception device. A load 5 is connected to the energy storage device 4. The load 5 is operated by the power stored in the energy storage device 4. The load 5 is a microcomputer, a wireless communication unit, a sensor, or the like. The output of the sensor is wirelessly transmitted under the control of the microcomputer.

The antenna device 1 includes a first antenna element that is in contact with a metal and a second antenna element. An example of the antenna device 1 will be described with reference to FIG. 2A (plan view), FIG. 2B (cross-sectional view), FIG. 2C (cross-sectional view), FIG. 3A (plan view), FIG. 3B (cross-sectional view), and board diagrams (FIGS. 5 and 6 on which the rectifier circuit 2 (described later) is mounted. As illustrated in FIGS. 2A, 2B, 2C, 3A, and 3B, the first antenna element 11 that is in contact with or connected to the industrial product metal portion is configured in a plate shape (patch shape). The antenna element 11 has a plate shape including a conductor such as gold, silver, aluminum, copper, iron, nickel, an alloy, or the like. The contact surface of the antenna element 11 with metal may be coated with resin. The antenna element 11 has a shape such as a linear shape, a pin shape, a hemispherical shape, or an uneven shape in accordance with the shape of the industrial product metal portion. The industrial product metal portion and the antenna element 11 are brought into contact with or connected to each other by a method such as welding, mechanical coupling (caulking or the like), adhering with a conductive adhesive, or bonding to an iron material or the like using magnetism of a magnet or the like.

Further, as the antenna element 11, for example, a conductive resin, a conductive rubber, or the like in which carbon, metal, or the like is blended may be used. By using the conductive resin, for example, electrodes of various shapes can be easily formed. Further, by using the conductive rubber, an electrode that can be elastically deformed, an electrode having high adhesion, and the like can be configured.

In addition, the material of the antenna element 11 is not limited, and the materials described above may be used alone, or the electrodes may be configured by combining the respective materials.

Figure 4:
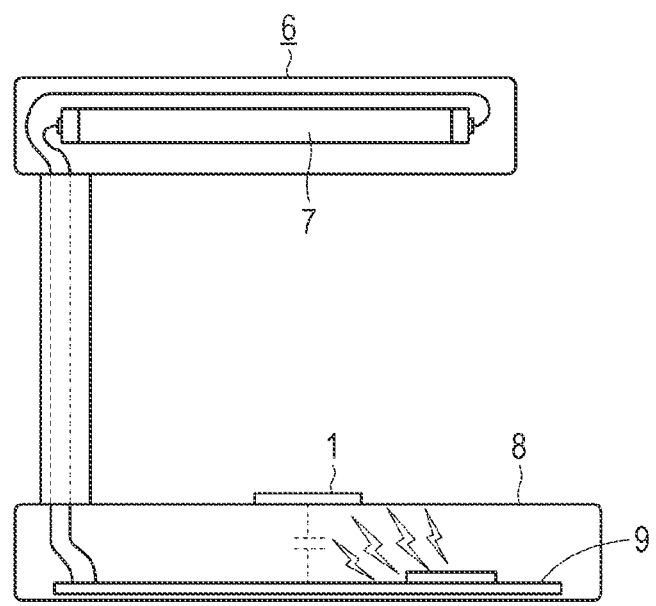
FIG. 4 is a schematic diagram for explaining a specific example of the antenna device.

Note that it is sufficient that the antenna element 11 can be capacitively coupled with a metal even if a space or an insulator is interposed. FIG. 4 illustrates a desk light 6 with a fluorescent lamp 7. The antenna device 1 is attached to a main body 8 in a state of being housed in, for example, a resin case.

A circuit unit such as an inverter is mounted on a board 9 housed in the resin case of the main body 8. The inverter turns on the fluorescent lamp 7 by once changing a commercial power supply of 50 Hz or 60 Hz to a direct current and further changing to a high-frequency signal of 20 to 50 kHz. In this lighting method, there is no flicker peculiar to a fluorescent lamp as compared with lighting at a frequency of a commercial power supply. As indicated by arrows, spatial noise is generated from the circuit unit. The antenna device 1 is spatially coupled to a board on which the circuit unit such as the inverter is mounted, and can induce a voltage by spatial noise. Experiments have confirmed that a voltage of about 4.4 V is induced, for example, in a case where a fluorescent lamp is turned on.

Figure 2A:
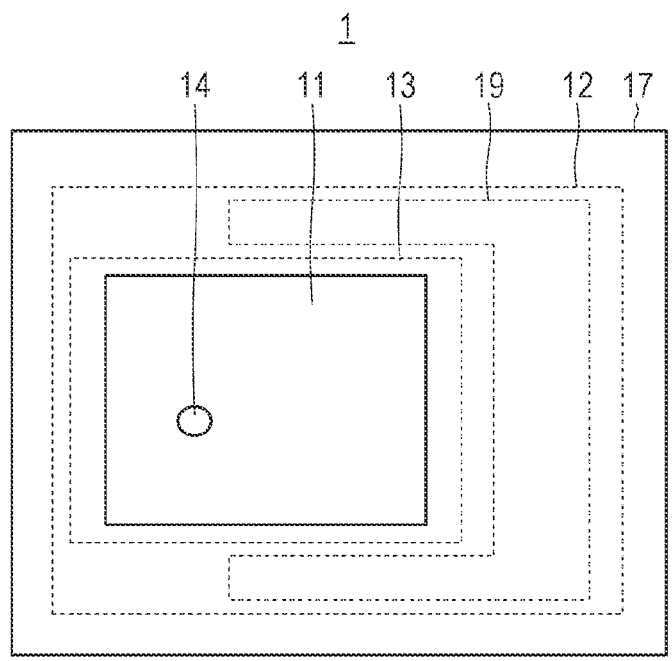
FIGS. 2A, 2B, and 2C are a plan view and cross-sectional views of an example of an antenna device included in the reception device.
Figure 2B:
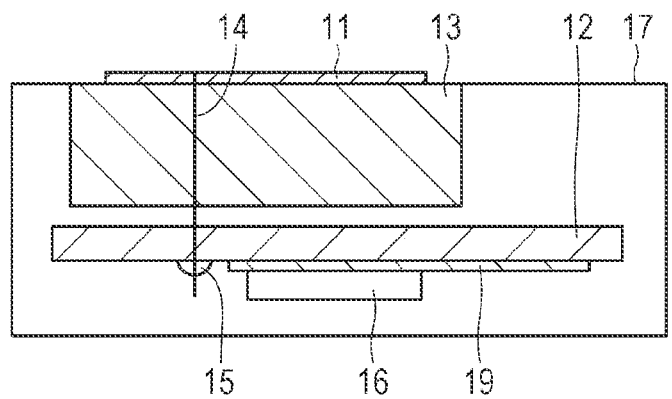
Figure 2C:
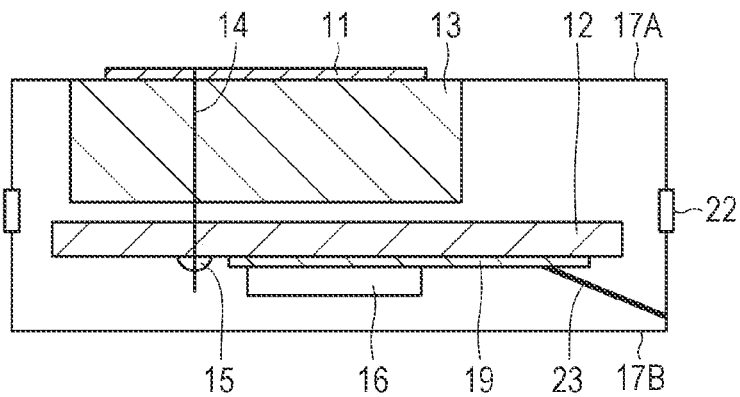

In FIGS. 2B and 2C, for example, the plate-like (patch-like) antenna element 11 and a device board (circuit board) 12 are disposed to face each other, and a dielectric plate 13 is interposed between the antenna element 11 and the device board 12. The space between the antenna element 11 and the device board 12 may be formed without providing the dielectric plate 13.

In order to electrically connect the antenna element 11 and the device board 12, one end of the antenna element 11 and one end of the conductive pin 14 are electrically connected, and the other end of a conductive pin 14 penetrates the device board 12 and is soldered to the signal path electrode on the back surface of the device board 12. The antenna element 11 and a ground including a copper foil pattern of the device board 12 constitute the antenna unit 1a. The ground is the second antenna element. The antenna unit 1a has a structure of a T-type antenna using a flat plate as an antenna element. A connection portion between the signal path electrode of the device board 12 and the conductive pin 14 serves as a feeding point 15 of the antenna. A circuit unit 16 is provided on, for example, the back surface of the device board 12.

The antenna device having the above-described configuration is housed in a case 17. The contact surface of the case 17 other than the antenna element 11 includes an insulating material such as resin. Furthermore, a case side surface, a case opposite surface, and the like other than the contact surface with the metal that is intended to take in energy also include an insulating material.

FIG. 2C illustrates a configuration in which the case 17 includes a case 17A including a non-metal such as resin or the like and a case 17B including a metal. The ground 19 on either the upper or lower surface of the device board 12 and the case 17B may be electrically connected to each other. That is, the case 17A including an insulating material on which the antenna element 11 is provided and the case 17B including a metal material constituting the opposite surface may be connected by a connection unit 22 such as a screw, and the case 17B and the ground 19 of the device board 12 may be connected by a wire 23.

Figure 3A:
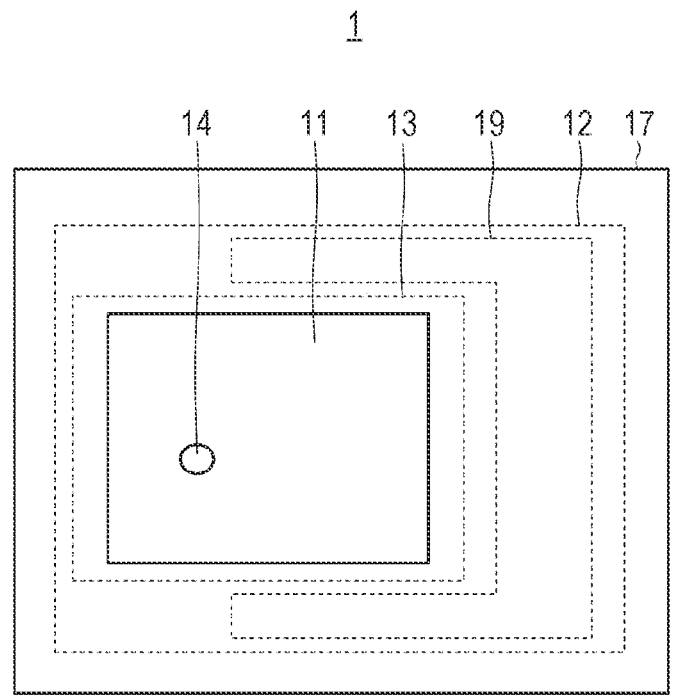
FIGS. 3A and 3B are a plan view and a cross-sectional view of another example of the antenna device included in the reception device.
Figure 3B:
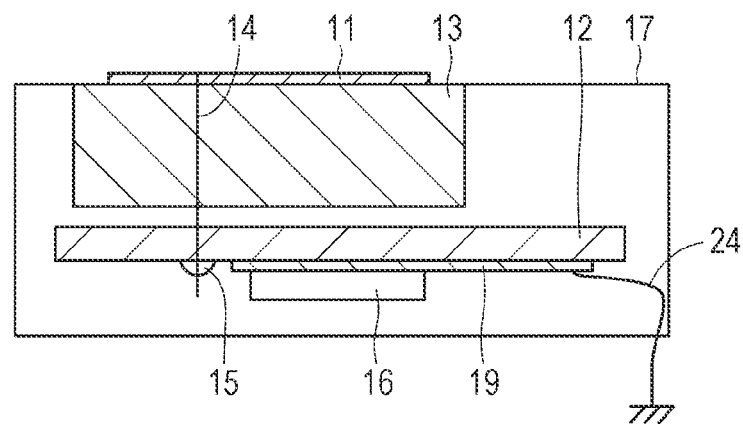

Furthermore, as illustrated in FIGS. 3A and 3B, an insulated covered cable 24 may be further connected to the ground 19 including a copper foil pattern of the device board 12 by solder or the like to be grounded to the earth ground. In the present example, the antenna element 11 described above is formed in a plate shape, and is configured to be in contact with or connected to the industrial product metal portion. However, the antenna element 11 and the feeding point 15 can be directly connected to each other using an insulated covered cable or the like with respect to the industrial product metal portion.

Figure 5:
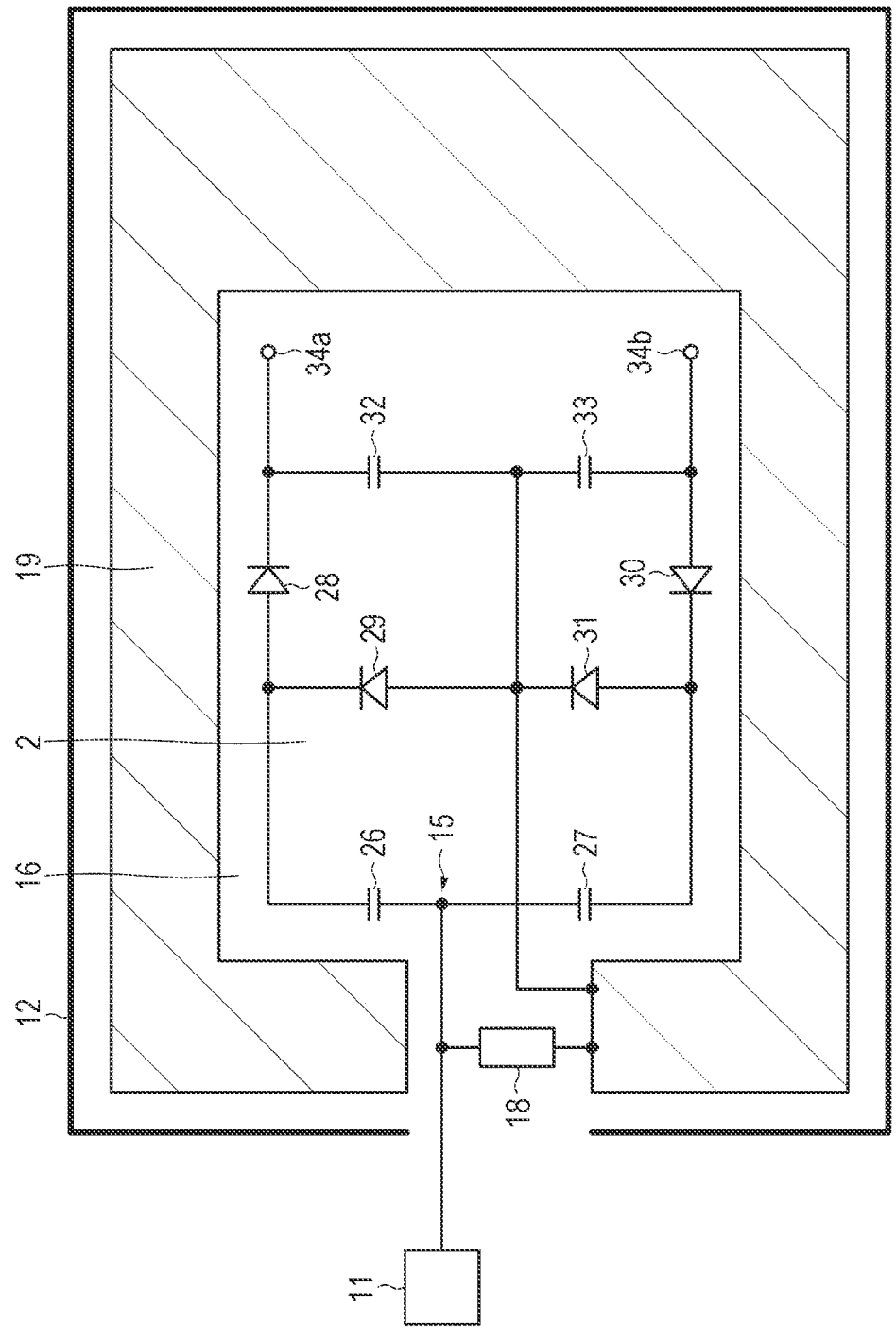
FIG. 5 is a schematic diagram for explaining a first example of an antenna device including a device board.

As illustrated in FIG. 5, the ground 19 including the copper foil pattern is formed on the circuit board 12, and the antenna element 11 and the ground 19 including the copper foil pattern of the device board 12 constitute the antenna unit 1a. The ground 19 is the second antenna element. Furthermore, as an electrostatic countermeasure, an electrostatic protection component, for example, a varistor 18 is inserted between the antenna element 11 in contact with or connected to the metal and the ground including the copper foil pattern of the reception device. Note that the varistor 18 may be connected between an output terminal 34a and the ground 19.

The circuit unit 16 includes the rectifier circuit 2. The rectifier circuit 2 does not overlap the ground 19 including the copper foil pattern of the device board 12. An input line output from the antenna element 11 to the rectifier circuit 2 is connected in series to the rectifier circuit without interposing a matching circuit. The charger 3 and the energy storage device 4 (not illustrated) may be included in the circuit unit 16, or may be provided separately.

Figure 6:
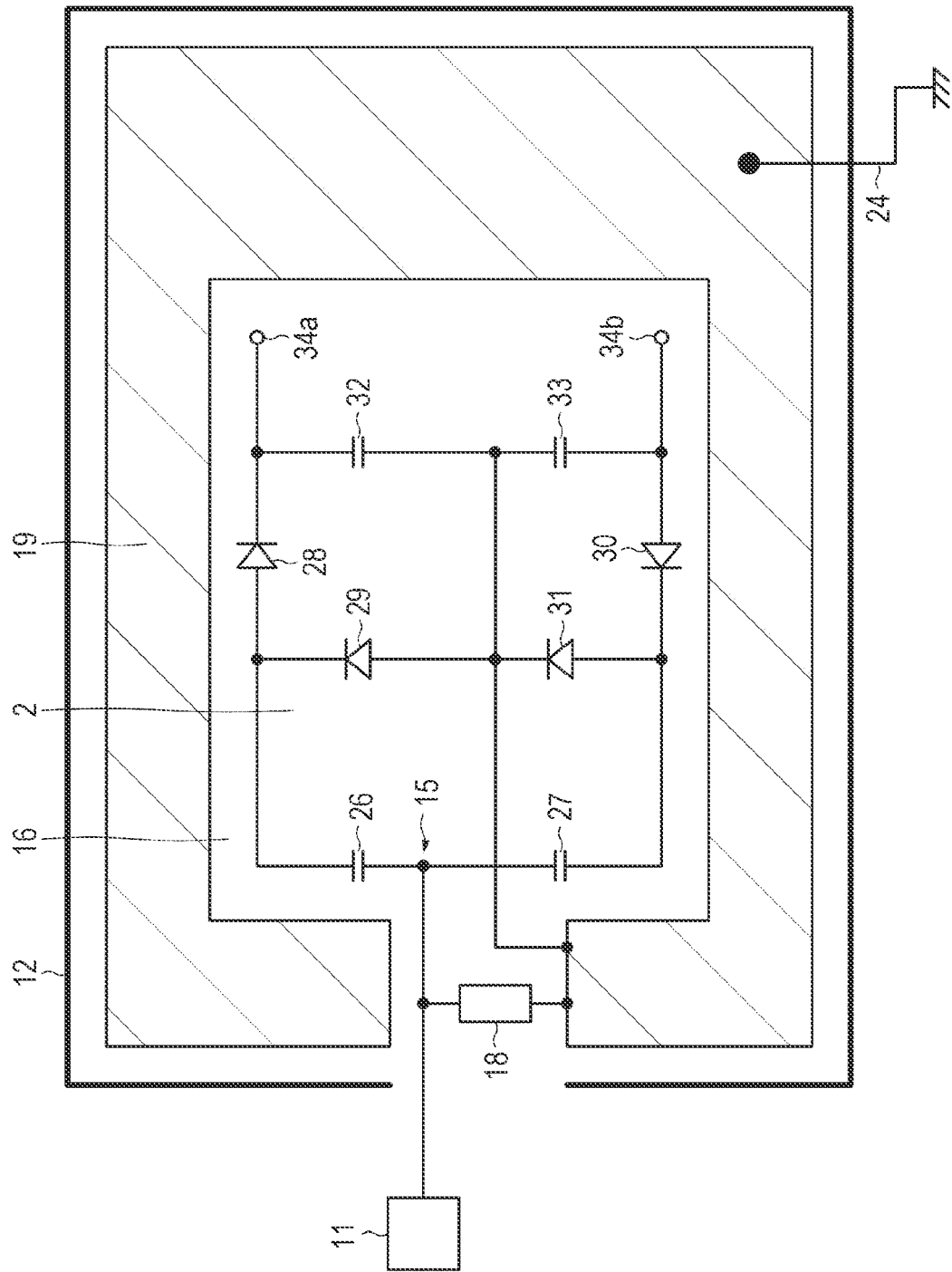
FIG. 6 is a schematic diagram for explaining a modification of the first example.

FIG. 6 illustrates a configuration of the device board 12 corresponding to FIGS. 3A and 3B. The ground 19 (indicated as a shaded region) including the copper foil pattern of the device board 12 is grounded to the earth ground via the insulated covered cable 24. The earth ground may function as a low potential ground such as a wide conductive plate including the earth. Note that the varistor 18 may be connected between an output terminal 34a and the ground 19.

Figure 7:
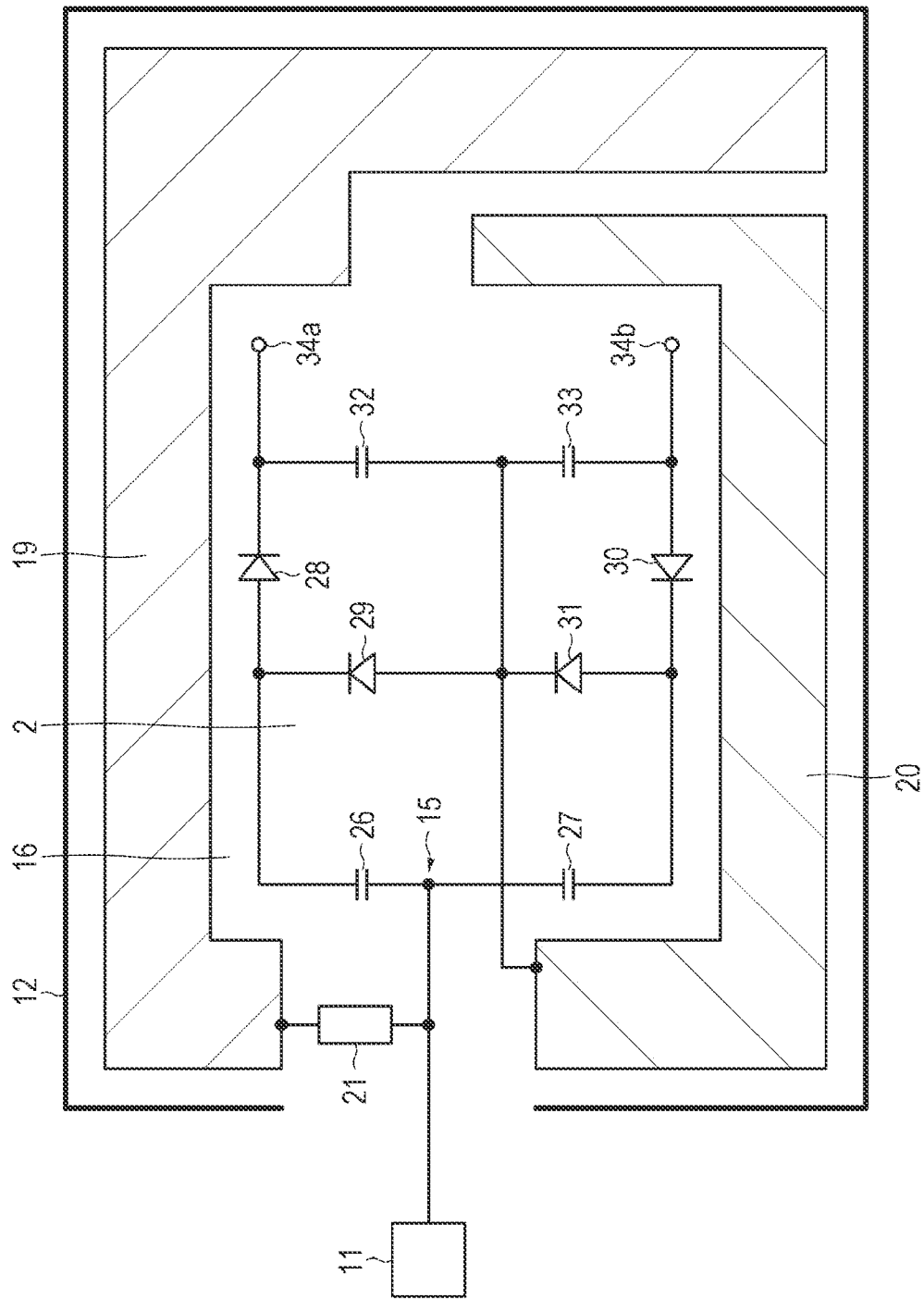
FIG. 7 is a schematic diagram for explaining a second example of the antenna device including the device board.
Figure 8:
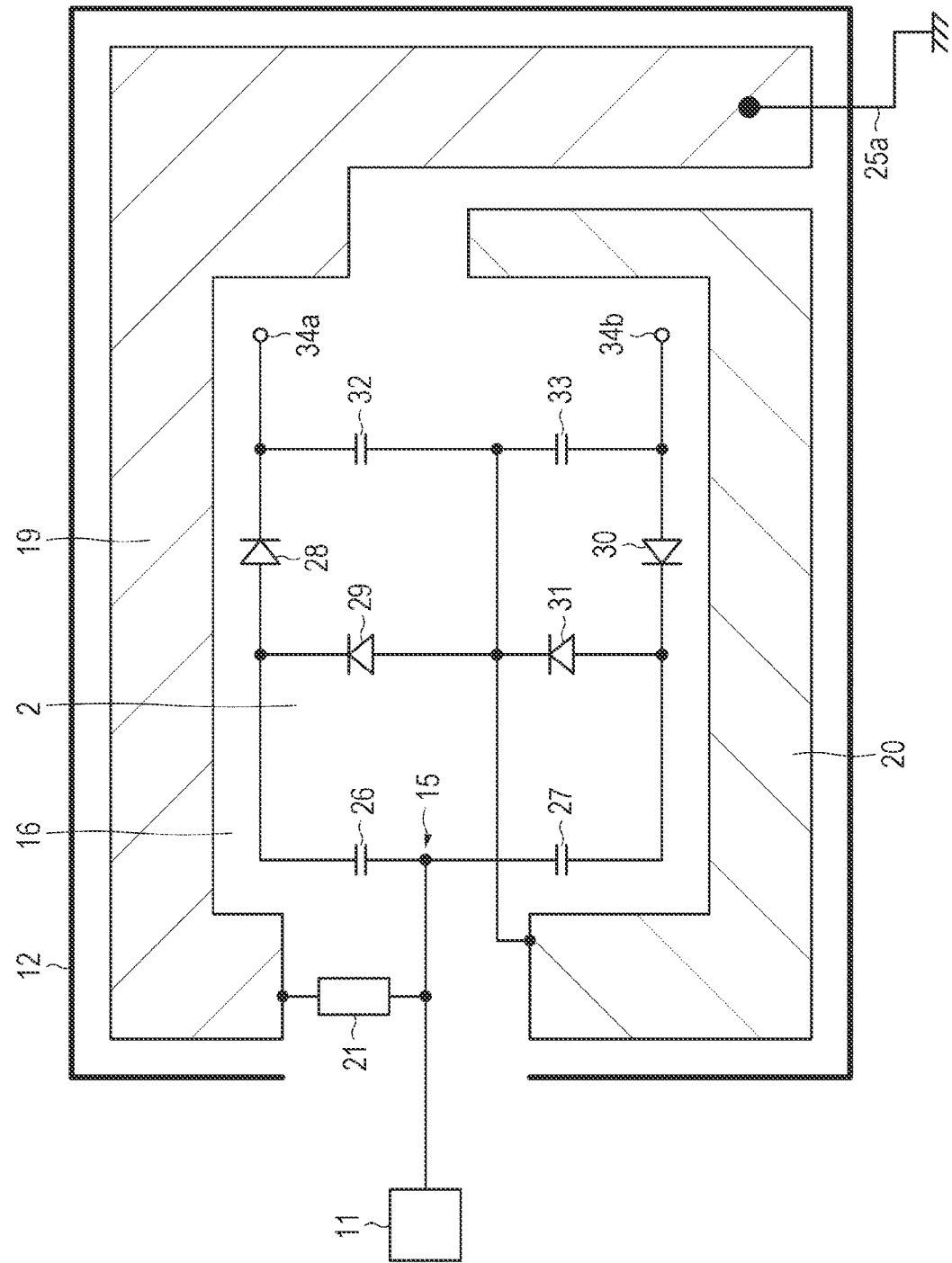
FIG. 8 is a schematic diagram for explaining a modification of the second example.

Next, as illustrated in FIG. 7, a separate second antenna element 20 (illustrated as a shaded region) including a copper foil pattern may be made on the board described above. In this case, it is necessary to prevent the separate second antenna element 20 from coming into contact with or being connected to the industrial product metal portion that is intended to take in energy. Furthermore, as illustrated in FIG. 8, an insulated covered cable 25a may be further connected to the ground 19 (indicated as a shaded region) including the copper foil pattern of the device board 12 to be grounded to the earth ground. Furthermore, in FIGS. 7 and 8, it is formed on a separate board, but it may be formed on a metal portion such as a housing configured not to come into contact with the metal on the opposite side of the metal contact surface of the receiver. Also in this case, as an electrostatic countermeasure, an electrostatic protection component such as a varistor 21, for example, can be inserted between the antenna element 11 in contact with the metal and the ground of the reception device. Note that the varistor 21 may be connected between an output terminal 34a and the ground 19.

Figure 9:
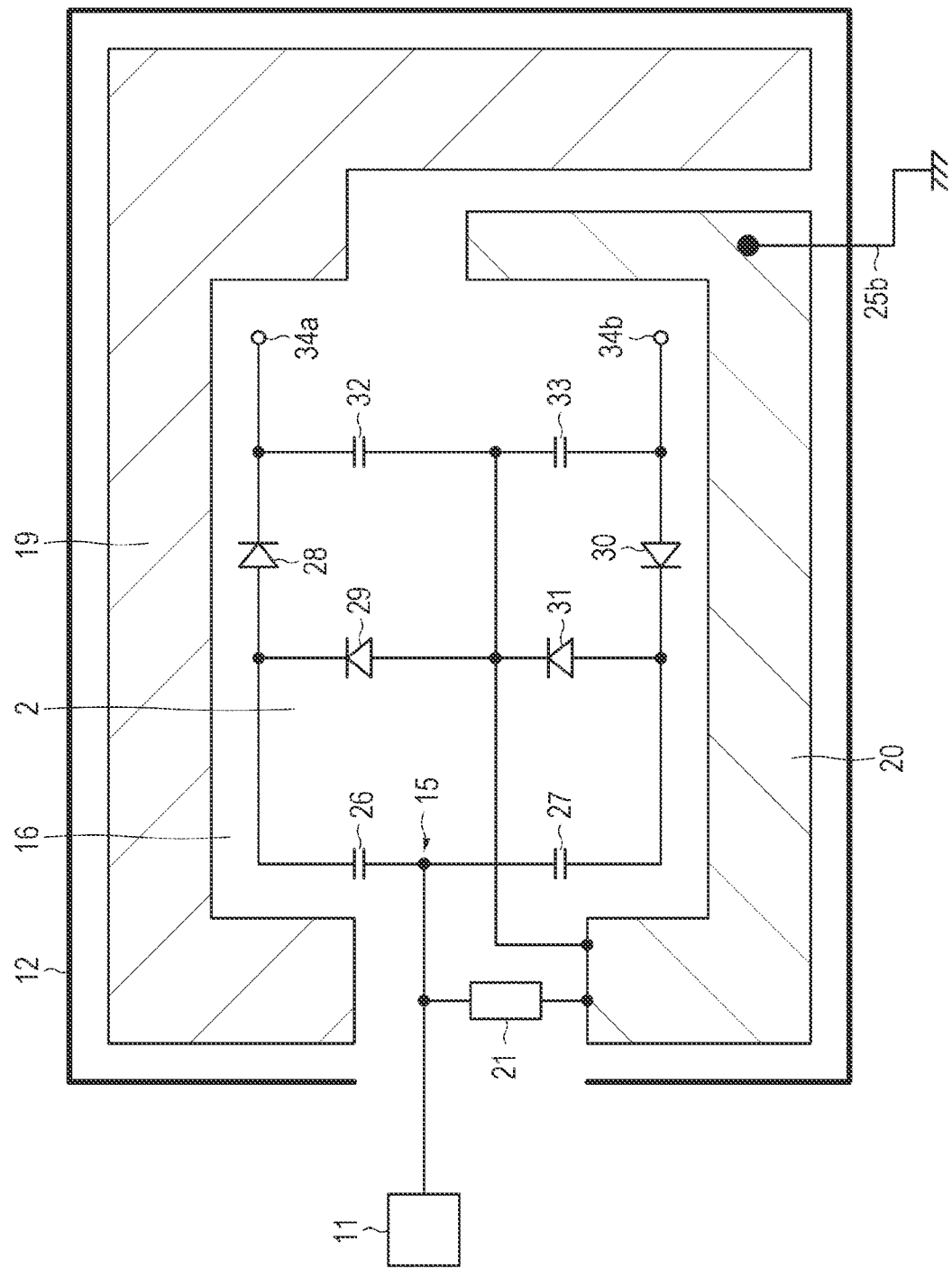
FIG. 9 is a schematic diagram for explaining a third example of the antenna device including the device board.

Moreover, as illustrated in FIG. 9, as an electrostatic countermeasure, an electrostatic protection component, for example, a varistor 21 may be inserted between the antenna element 11 in contact with the metal and the antenna element 20, and an insulating covered cable 25b may be connected to the antenna element 20 to be grounded to the earth ground. In this case, the antenna element 20 can extract much more power than the electric field generated with the ground of the earth by capacitive coupling. In a case where it is assumed that power is extracted from a metal product such as a microwave oven or a refrigerator in a room, it is required to drop the product to the ground as an electrostatic countermeasure. In a case where power is extracted from a metal portion of such a product, it is necessary to cope with the case by connecting the product with an insulating covered cable or the like as described above. Note that the varistor 21 may be connected between an output terminal 34a and the ground 19.

Figure 10:
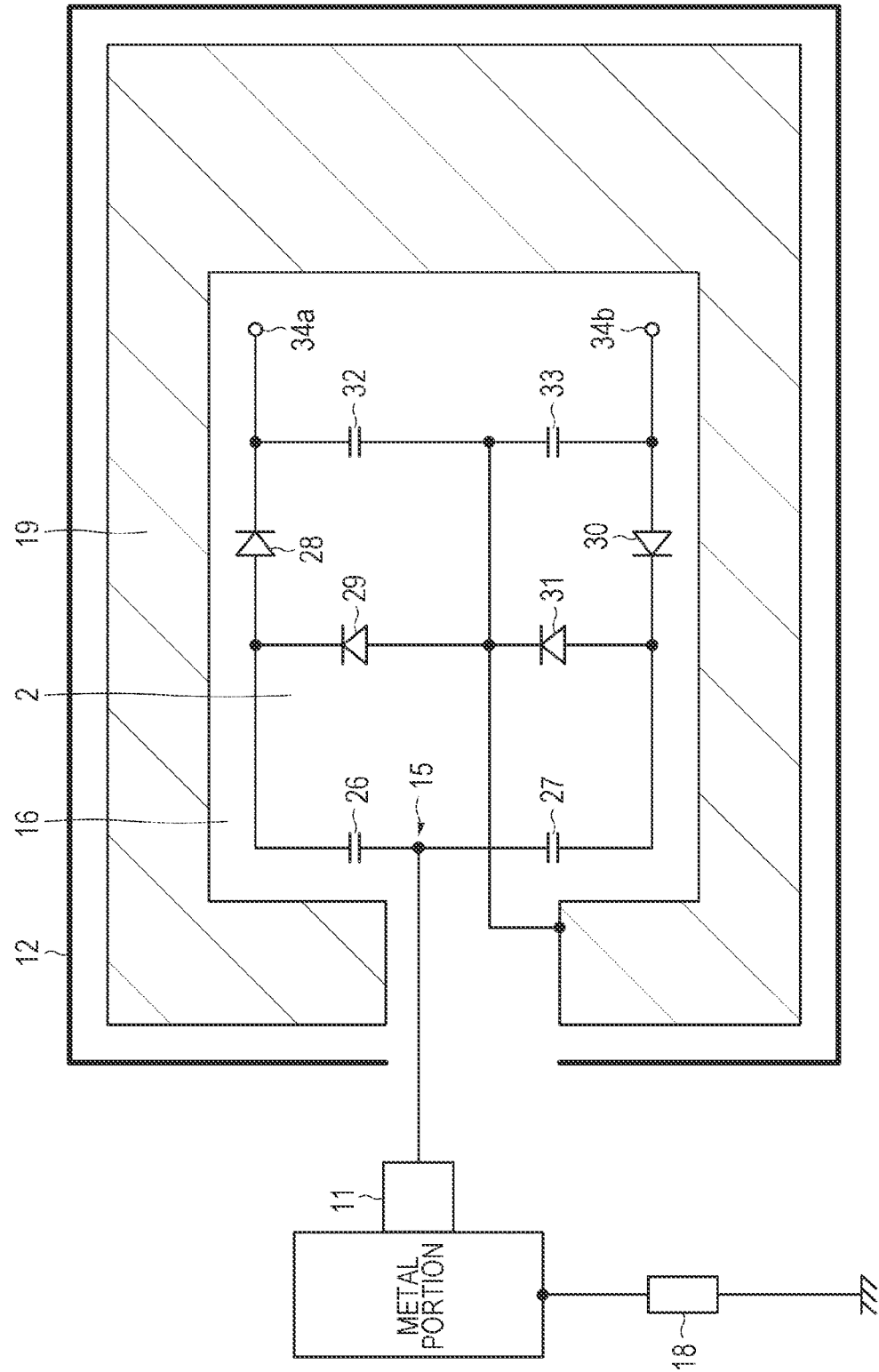
FIG. 10 is a connection diagram for explaining a modification of the antenna device.
Figure 11:
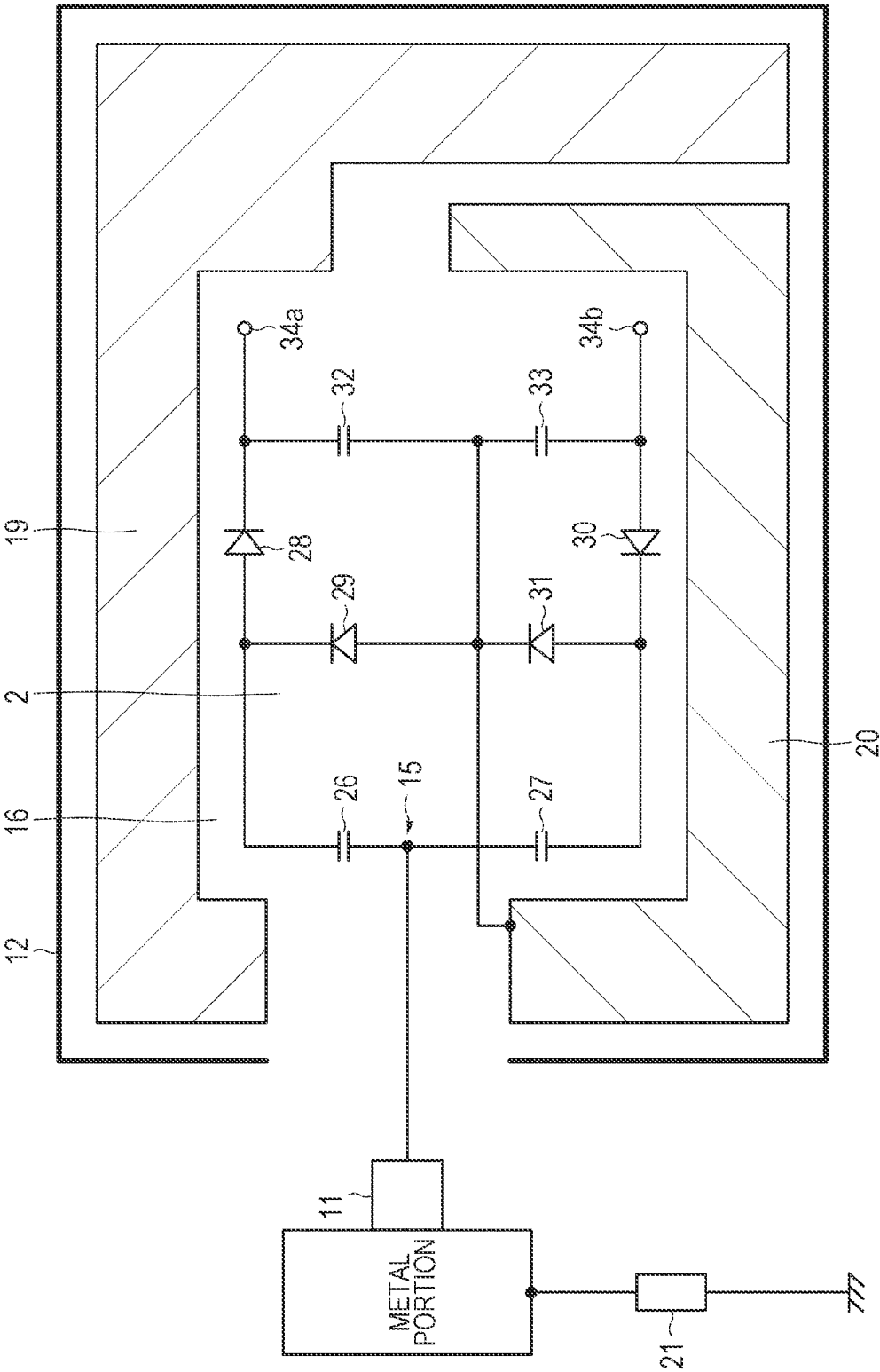
FIG. 11 is a connection diagram for explaining a modification of the antenna device.

FIGS. 10 and 11 are diagrams illustrating modifications of FIGS. 5 and 7. That is, in a case where grounding is done by an insulating covered wire directly from the industrial product metal portion to the earth ground, it is grounded with an electrostatic protection component such as the varistor 18 or the like interposed in the middle of the insulating covered wire. In the case of an existing electrical appliance that requires a separate grounding connection, the above-described configuration is used.

Figure 12A:
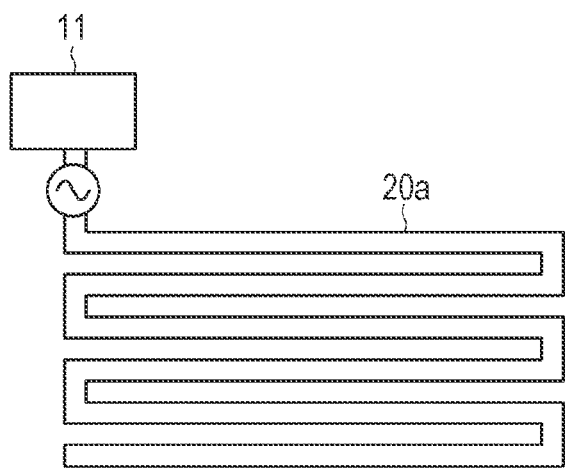
FIGS. 12A, 12B, and 12C are schematic diagrams illustrating specific examples of a second antenna element.
Figure 12B:
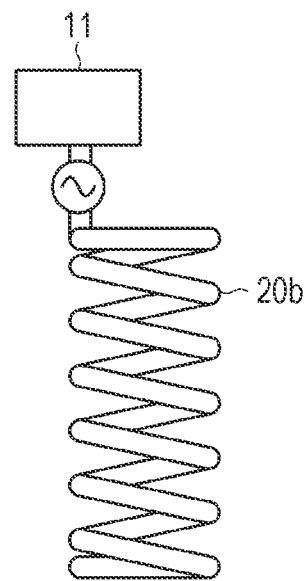
Figure 12C:
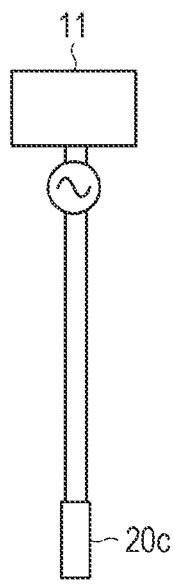

Other configurations of the second antenna element 20 are illustrated in FIG. 12. FIG. 12A illustrates a configuration of a meander line 20a, and FIG. 12B illustrates a configuration of a coil 20b. The coil 20b may be configured as a chip coil. FIG. 12C illustrates a configuration in which an inductor 20c is provided at the tip portion. These configurations can reduce the footprint, increase the antenna length, and increase the induced voltage.

There is a great deal of electric field energy around us, which can be divided into low frequency components and high frequency components. For example, a leakage electric field (50 Hz/60 Hz) from a home AC power supply, noise present in the vicinity of a personal computer, and the like are low frequency components. These are referred to as quasi-electrostatic fields (near field). On the other hand, radio broadcasting (AM/FM), television broadcasting, mobile phone radio waves, and the like are high frequency components. These are referred to as radio waves (far field).

Figure 13:
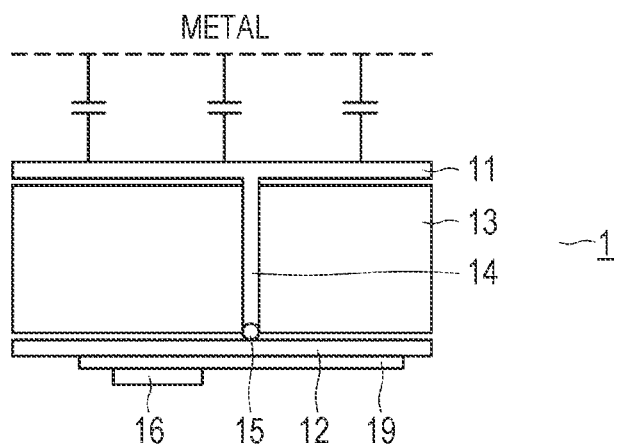
FIG. 13 is a schematic diagram for explaining the operation of the antenna device.

As illustrated in FIG. 13, the antenna element 11 of the antenna device 1 is brought into contact with an industrial product metal portion, for example, a metal of a metal rack 91. The antenna element 11 is attached to one surface of the metal rack 91. Electrically, the metal portion and the antenna element 11 are brought into contact with each other by capacitive coupling. Since the metal portion of the metal rack 91 is used as an antenna, the antenna device 1 can take in energy of both a low frequency quasi-electrostatic field such as noise and a radio wave such as a broadcast wave.

For the antenna device 1, it is preferable that the antenna element 11 is directly connected to the industrial product metal portion, but in this example, the antenna element is basically in surface contact to increase the capacity. It is sufficient that it is in contact with or connected to the metal portion. In the case off contacting, it may be fitted in a pin structure, a hemispherical shape, or an uneven shape other than a planar shape. In the case of connecting, it may be connected directly by screwing, soldering, welding, or the like or via an insulator (or air) such as an insulating covered cable or conductive rubber. The antenna unit 1a including the antenna element 11 in contact with the metal and the ground electrode 19 of the device board 12, or the separate second antenna element 20 can receive electric field energy to generate power.

Figure 14:
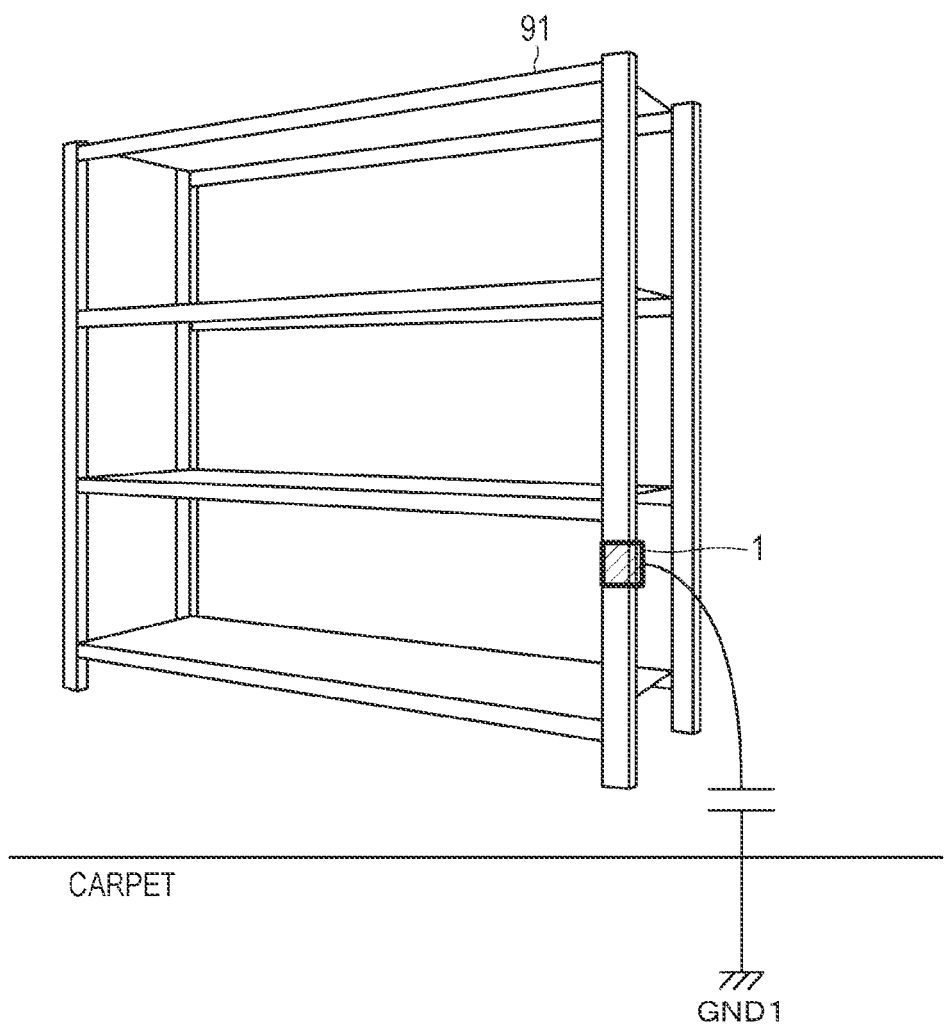
FIG. 14 is a schematic diagram used for description of an embodiment in which the present technology is applied to a metal rack.

As illustrated in FIG. 14, for example, the metal rack 91 exists in an electrically floating state on a carpet which is an insulating material, and in a state where the antenna device 1 (hatched portion) including the antenna unit 1a is stuck, the circuit configuration of FIGS. 5 and 7 can be adopted. In this case, it can be considered that the ground 19 (not illustrated here) of the device board 12 or the separate second antenna element 20 (not illustrated here) and the earth ground (GND1) are capacitively coupled to configure a large antenna unit. The antenna unit can receive a low frequency quasi-electrostatic field.

Figure 15:
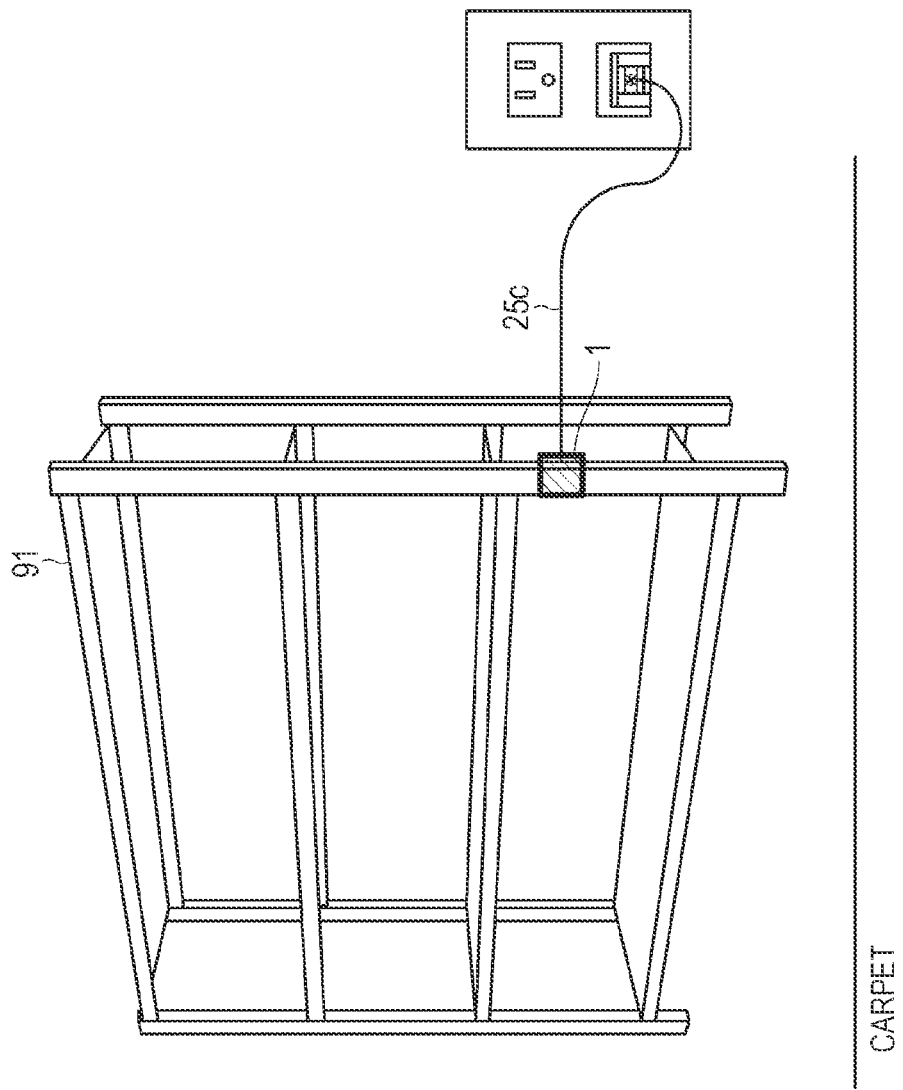
FIG. 15 is a schematic diagram used for description of an example of an embodiment.

When FIG. 15 has the circuit configuration as in FIG. 10, the effect of taking in energy from space is further enhanced. That is, the separate second antenna element 20 can be implemented by being installed, for example, on the earth ground (GND) at a grounding outlet via the insulating covered cable 25c.

Figure 16:
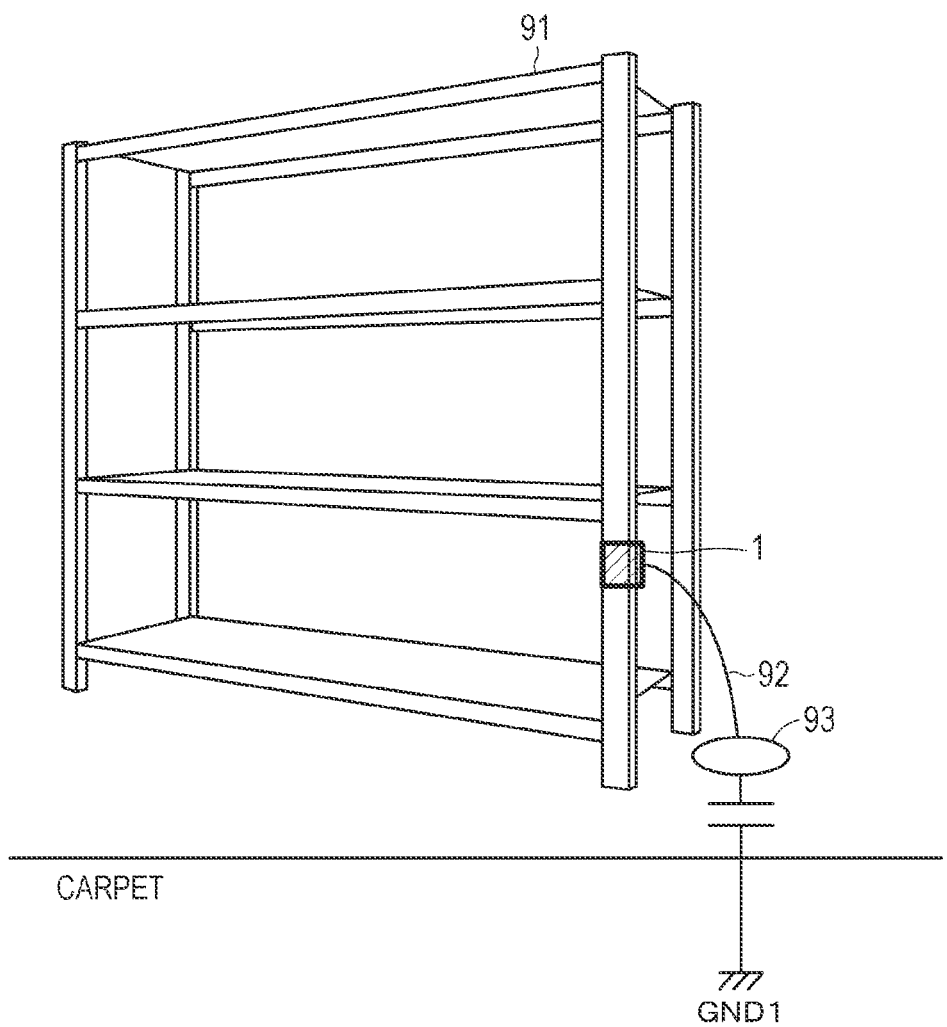
FIG. 16 is a schematic diagram used for description of a modification of the embodiment.

Moreover, as illustrated in FIG. 16, the antenna device 1 (hatched portion) including the antenna unit 1a may be connected to the metal plate 93 by an insulating covered cable 92, and the metal plate 93 may be brought close to the earth ground (GND1) so that the antenna device is capacitively coupled to the earth ground (GND1).

Figure 17A:
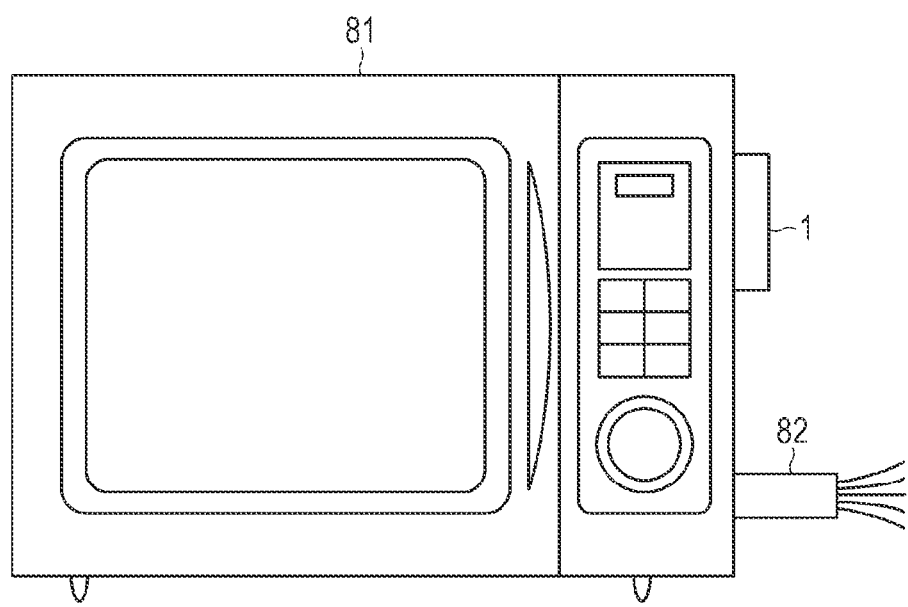
FIGS. 17A and 17B are schematic diagrams used for description of an example applied to a microwave oven.
Figure 17B:
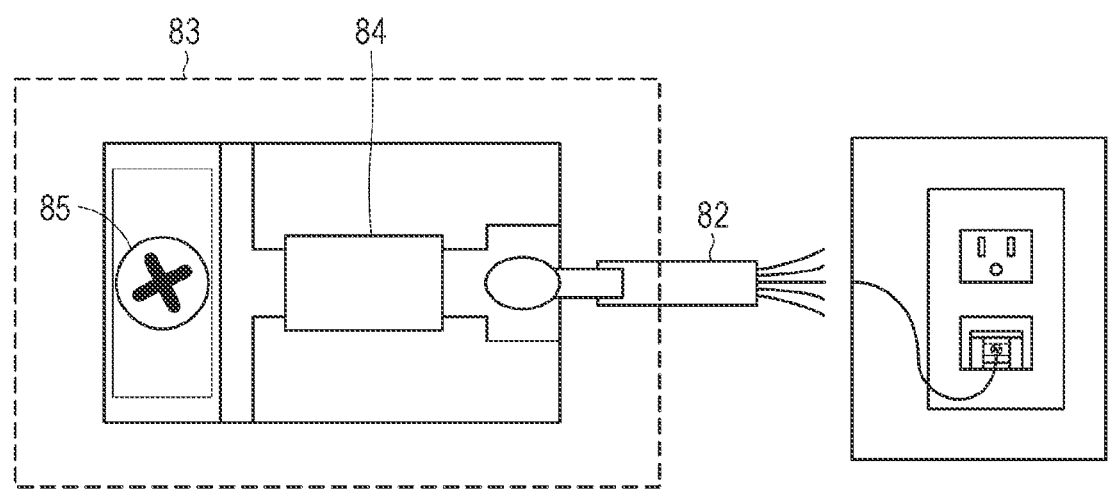

Next, a configuration example of the example of FIGS. 10 and 11 is illustrated in FIGS. 17A and 17B. In a case where a grounding cable 82 attached to a microwave oven 81 is grounded, an electrostatic protection component 83 is provided between the grounding cable 82 and a grounding terminal of a power supply outlet. In the electrostatic protection component 83, a screw portion 85 for connecting the grounding cable 82, a varistor 84 for electrostatic protection, and the like are provided on a board, and the grounding cable 82 is soldered on the board.

In this manner, the antenna device 1 can receive the electric field energy in a wide frequency range. Thus, in the present antenna device according to the present technology, it is possible to easily take in wide electric field energy only by contacting with metal. Moreover, in a case where it is desired to increase the extraction amount, connection such as soldering or the like to the industrial product metal portion is more preferable. Furthermore, in a case where the metal rack includes iron, the connection may be maintained by a magnet.

Figure 18:
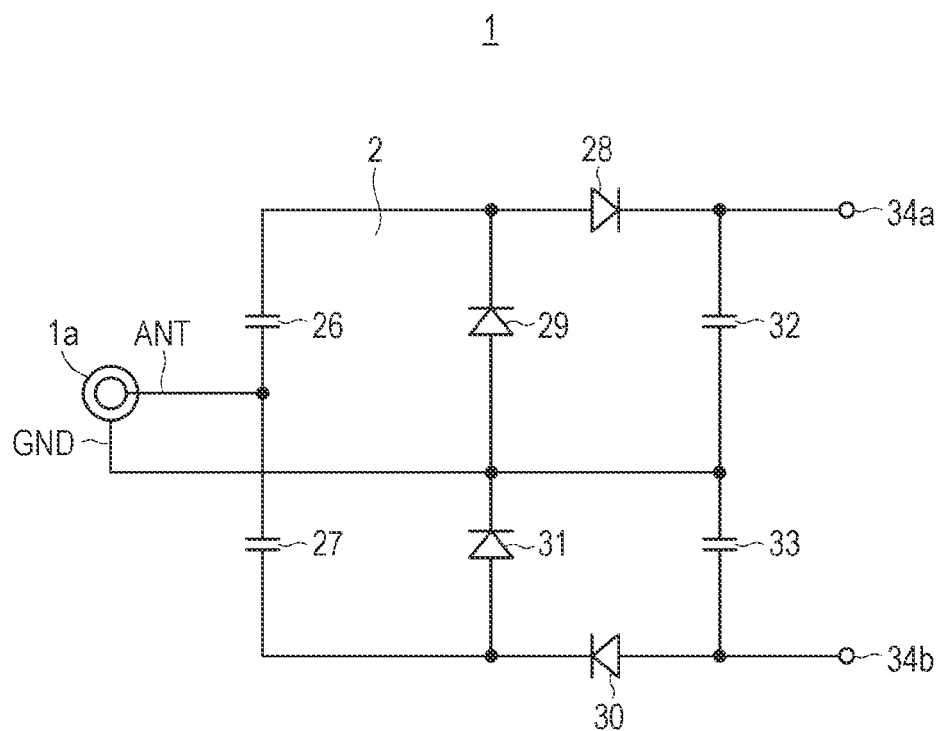
FIG. 18 is a connection diagram illustrating a configuration of an example of a rectifier circuit.

An example of the rectifier circuit 2 is illustrated in FIG. 18. In the case of handling a small voltage such as energy harvesting, rectification can be performed by a normal rectifier circuit, but a certain level of voltage is required in order to store energy quickly. Therefore, like a voltage doubler circuit, it is necessary to boost and rectify. Thus, by inserting a capacitor at a level desired to be boosted into a preceding stage of the diode and performing rectification, a voltage corresponding to the capacitor is added, and boosting can be performed. Therefore, a configuration of a full-wave voltage quadrupler rectifier circuit including input capacitors 26 and 27, diodes 28, 29, 30, and 31, and capacitors 32 and 33 connected to the antenna unit 1a is used. Direct current is output from both ends of the series connection of the capacitors 32 and 33 and from output terminals 34a and 34b. In the present configuration, the capacitors 32 and 33 are portions that actually store the current in addition to the voltage increase, and thus the capacity of this portion is preferably large and the leakage current is preferably small.

The present example uses a full-wave voltage quadrupler rectifier circuit, but may use a rectifier circuit incorporating a normal 1x half-wave rectifier circuit, full-wave rectifier circuit, voltage doubler rectifier circuit, or Cockcroft-Walton circuit. Furthermore, in terms of efficiency, since the full-wave rectifier circuit can increase the voltage of the AC signal and take in all, the full-wave rectifier circuit has a better result even if the loss of the diode is included with the diode adopted for rectification this time. Two-stage voltage quadrupler full-wave rectification is performed, but the number of stages may be further increased in a case where it is desired to increase the extraction voltage.

An example of the value of each element is illustrated below. Capacitors 26, 27: 0.22 µF, 32, 33: 47 µF, Diodes 28, 29, 30, 31: 1N60 (silicon)

Figure 19:
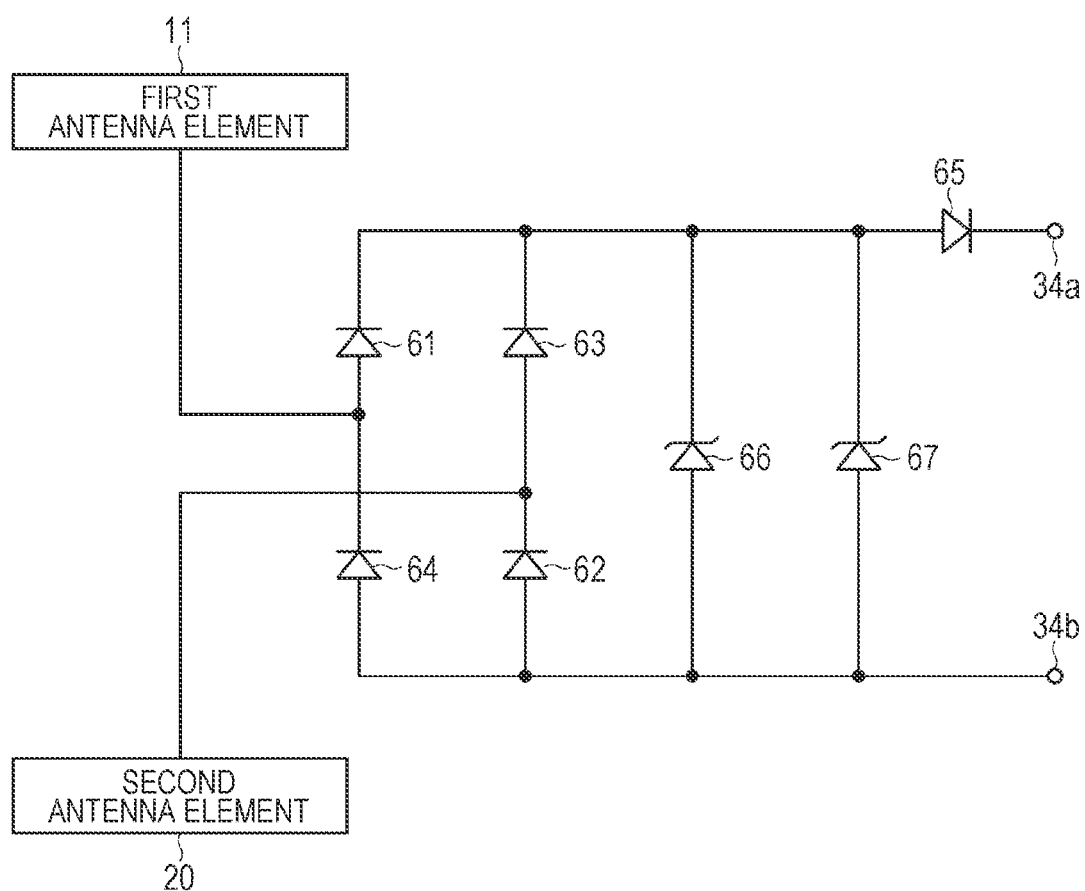
FIG. 19 is a connection diagram illustrating a configuration of another example of the rectifier circuit.

In the case of the voltage quadrupler rectifier circuit described above, it is important that the leakage current of the diode at the time of reverse bias is very small. In a case where there is a leakage current, a full-wave rectifier circuit is suitable. Another example (full-wave rectifier circuit) of the rectifier circuit 2 is illustrated in FIG. 19. As illustrated in FIG. 19, diodes 61 and 64 are connected in series, and diodes 63 and 62 are connected in series. A connection point of an anode of the diode 61 and a cathode of the diode 64 is connected to the first antenna element 11, and a connection point of an anode of the diode 63 and a cathode of the diode 62 is connected to the second antenna element 20. A cathode of the diode 61 and a cathode connection point of the diode 63 are connected to one output terminal 34a via a backflow prevention diode 65, and an anode of the diode 64 and an anode connection point of the diode 62 are connected to the other output terminal 34b. An electrostatic countermeasure varistor 66 and an IC protection Zener diode 67 (for example, a Zener voltage is 6.5 V) are connected in parallel between the output terminals 34a and 34b.

Figure 20:
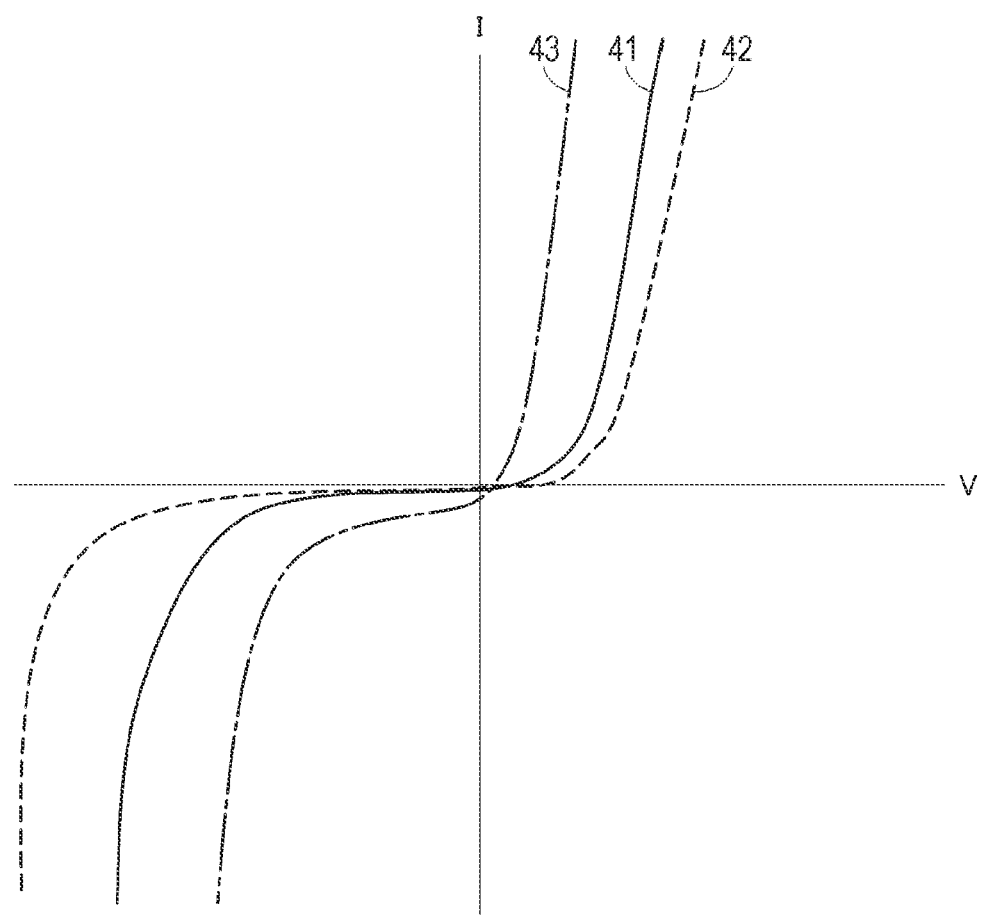
FIG. 20 is a graph for explaining characteristics of a diode of the rectifier circuit.

Note that, although it is configured by a discrete diode, it may be configured by a dedicated IC. FIG. 20 and Table 1 illustrates results of measurement of the forward voltage Vf and the reverse current Is of the diode used in the rectifier circuit 4. The diode product number 1N60 was measured using silicon and germanium products, and the other product number 1SS108 was evaluated using germanium products manufactured by different manufacturers. In FIG. 20, a curve 42 is a characteristic of 1N60 (silicon), a curve 41 is a characteristic of 1N60 (germanium), and a curve 43 is a characteristic of 1SS108 (germanium).

TABLE 1

|  | Room temperature | | Rectification |
| --- | --- | --- | --- |
|  | Forward voltage Vf [mV] | Reverse current Is [µA] | by metal antenna |
| 1N60 (Silicon) | 367 | 1 | ○ |
| 1N60 (Germanium) | 303 | 7 | X |
| 1SS108 | 162 | 26 | X |

A current flowing when a voltage is applied in the reverse direction of the diode is the reverse current Is. The measurement data in Table 1 is data when 10 V is added in the reverse direction of the diode. The forward voltage Vf is a voltage at which a forward current (1 mA) starts to flow through the diode.

In a case where the output of the antenna unit 1a described above is rectified, it has been found that the diode 1N60 (silicon) in which the current does not flow in the reverse direction can take in power more than the diode in which the voltage at which the current starts to flow in the forward direction is low. The rectified input is an alternating current, and the reverse current Is when the forward voltage Vf of the diode is applied in the reverse direction is data of 10 V in Table 1. Therefore, when the reverse current Is when the same voltage as Vf is applied in the reverse direction is calculated from the data, 1N60 (silicon) is 0.036 µA, 1N60 (germanium) is 0.21 µA, and 1SS108 (germanium) is 0.5 µA. Thus, the ratio of the reverse current Is at the forward current (1 mA)/forward voltage Vf is calculated to be 1/27778 for 1N60 (silicon), 1/4762 for 1N60 (germanium), and 1/2000 for 1SS108 (germanium). That is, for the diode used in the rectifier circuit 2, the above-described ratio needs to be larger than about 4700 times, and preferably, the above-described ratio is 10,000 or more. As a result, among the three diodes mentioned as examples, 1N60 (silicon) has the most suitable characteristics.

Moreover, considering the characteristics of the diode, the reverse current Is when applied in the reverse direction is preferably small, and when the reverse resistance value is calculated using data of 10 V, 1N60 (silicon) is 100 MΩ, 1N60 (germanium) is 1.43 MΩ, and ISS108 (germanium) is 0.38 MΩ. That is, the resistance value for preventing the current from flowing in the reverse direction is preferably large, and as the diode used in the rectifier circuit 2, the above-described resistance value needs to be larger than 1.43 MΩ, and is preferably 10 MΩ or more. As a result, among the three diodes mentioned as examples, 1N60 (silicon) has the most suitable characteristics.

Figure 21:
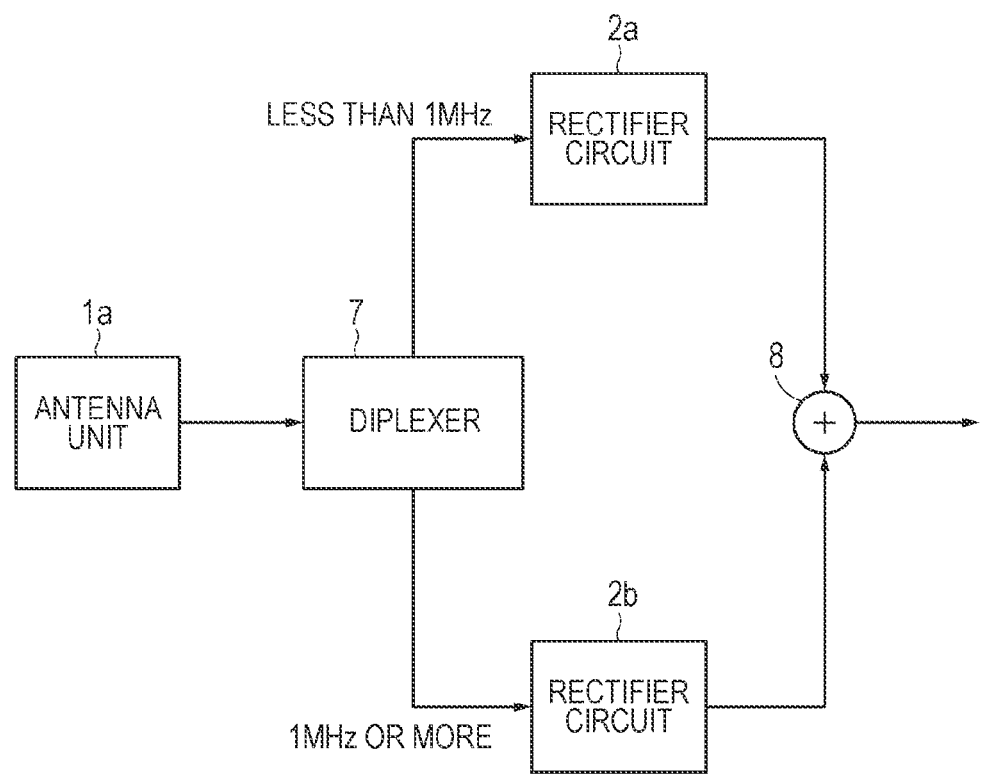
FIG. 21 is a block diagram of a modification of the circuit configuration.

In consideration of such a difference in characteristics of the diodes, as illustrated in FIG. 21, it is also possible to provide two rectifier circuits 2a and 2b and divide the output of the antenna unit 1a into two frequency components by a diplexer 7. A low frequency component less than a predetermined frequency, for example, less than 1 MHz divided by the diplexer 7 is supplied to one rectifier circuit 2a and rectified. Furthermore, a high frequency component of a predetermined frequency or more, for example, 1 MHz or more is supplied to the other rectifier circuit 2b and rectified. Outputs of the rectifier circuits 2a and 2b are added by an adder circuit 8 and output.

The rectifying diode constituting the rectifier circuit 2a has a characteristic suitable for rectifying the electric signal generated from the quasi-electrostatic field of the low frequency component, for example, a characteristic in which the reverse current Is at the time of the forward voltage Vf is small, and the rectifying diode constituting the rectifier circuit 2b has a characteristic suitable for rectifying the electric signal generated from the radio wave of the radiated electromagnetic field of the high frequency component, for example, a characteristic in which the forward voltage is low. The diplexer 7 that frequency-separates the output signal of the antenna unit 1a is configured with as little loss as possible. Note that 1 MHz of a predetermined frequency is an example, and may be divided into different frequencies depending on diode frequency characteristics, or the frequency division may be three or more.

Figure 22:
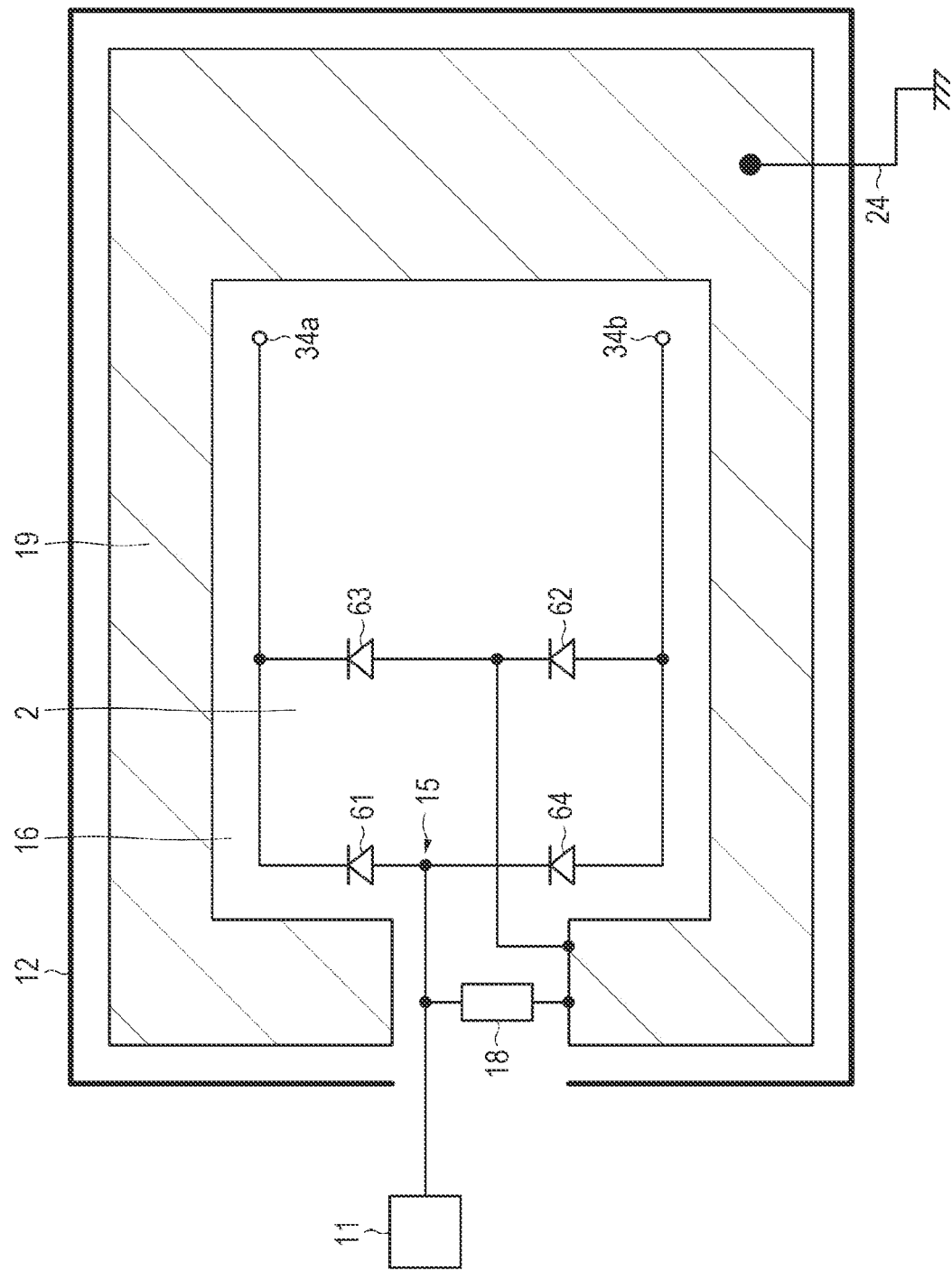
FIG. 22 is a connection diagram illustrating an example of a configuration of an antenna device using another example of the rectifier circuit.
Figure 23:
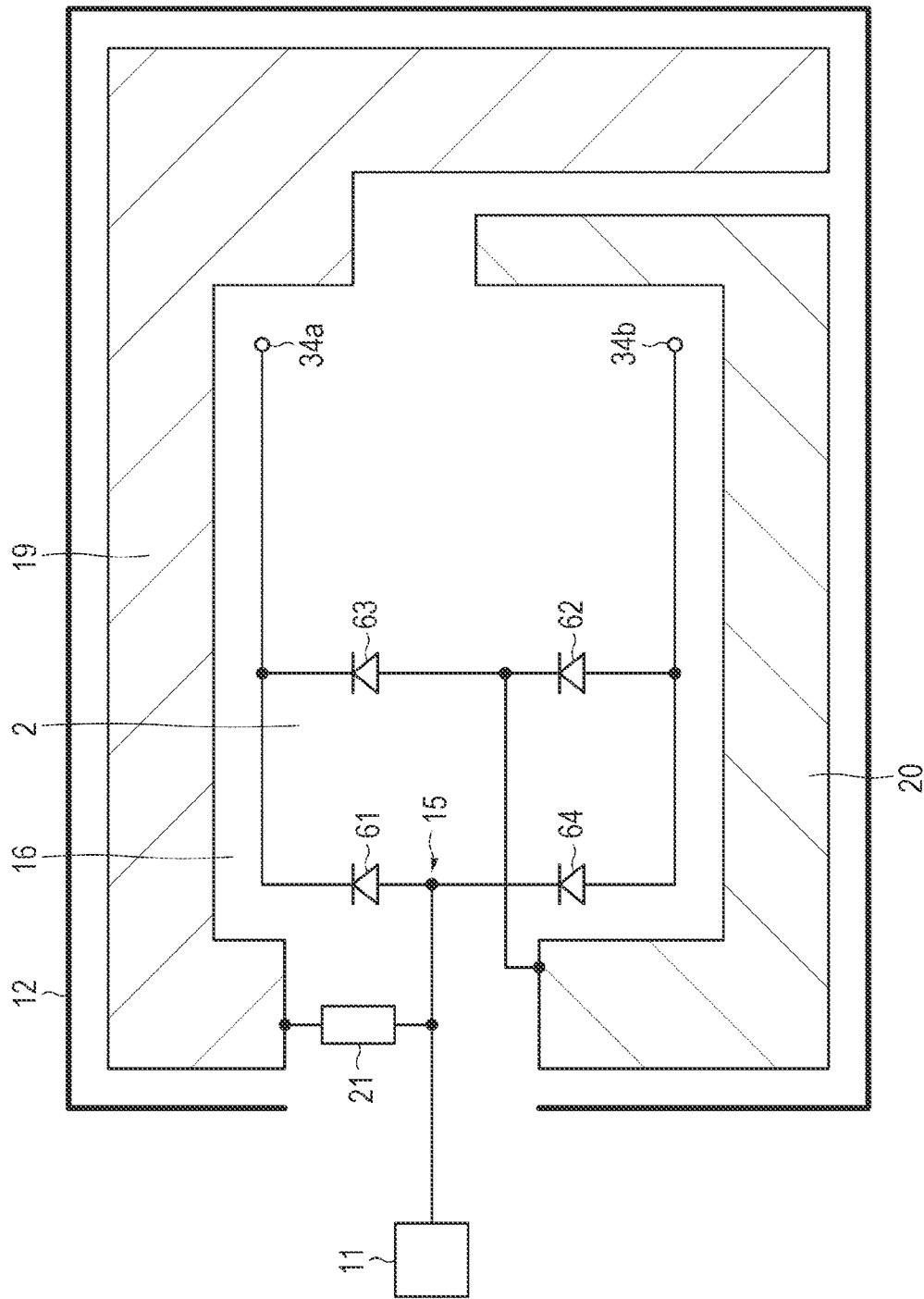
FIG. 23 is a connection diagram illustrating another example of the configuration of the antenna device using another example of the rectifier circuit.
Figure 24:
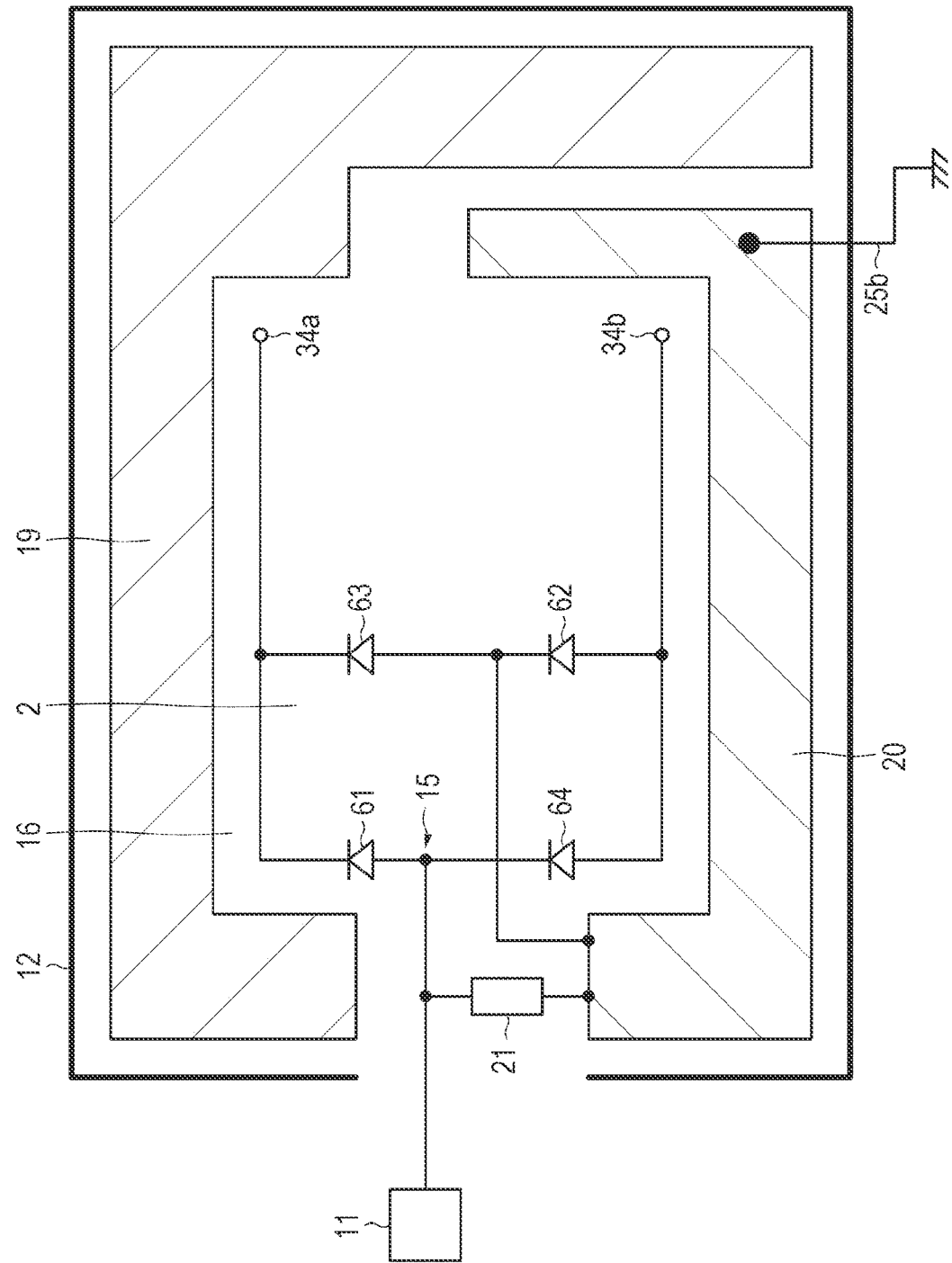
FIG. 24 is a connection diagram illustrating still another example of the configuration of the antenna device using another example of the rectifier circuit.

A configuration of an antenna device in a case where a full-wave rectifier circuit is used as the rectifier circuit will be described. FIG. 22 illustrates a configuration corresponding to the configuration of FIG. 6. Note that the varistor 18 may be connected between an output terminal 34a and the ground 19. FIG. 23 illustrates a configuration corresponding to the configuration of FIG. 7. Note that the varistor 21 may be connected between an output terminal 34a and the ground 19. FIG. 24 illustrates a configuration corresponding to FIG. 9. Note that the varistor 21 may be connected between an output terminal 34a and the ground 19. As described above, the full rectifier circuit 2 can be used in the same manner as the voltage doubler rectifier circuit.

According to the embodiment of the present technology described above, it is possible to take in the energy of the quasi-electrostatic field and the radio wave generated in the space by contacting or connecting the antenna element to the metal. If the energy taken in is rectified and stored in an energy storage device such as a secondary battery or the like, the energy storage device can be used as a power supply for an indoor sensor or an outdoor sensor.

Figure 25:
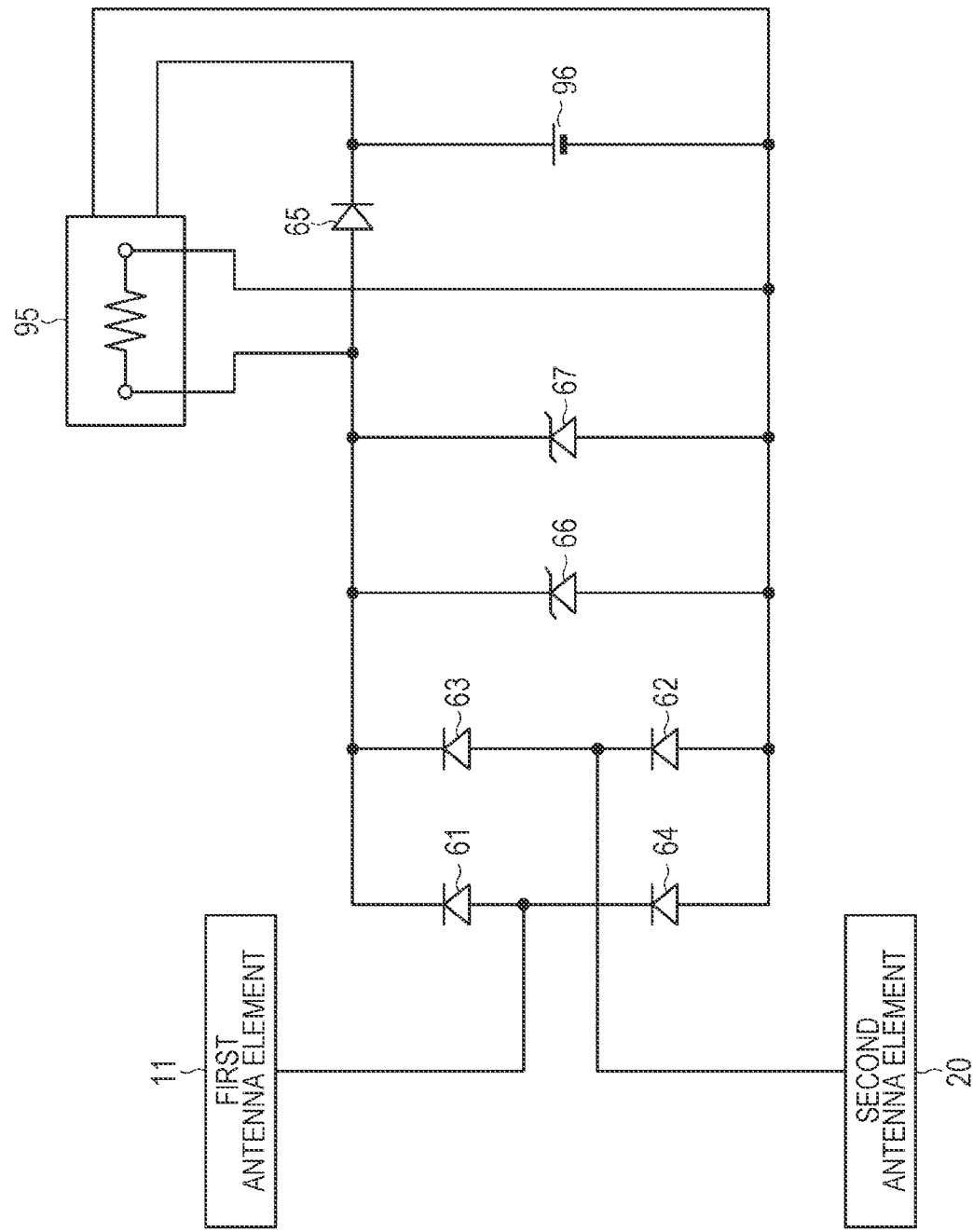
FIG. 25 is a connection diagram used to describe an application example of the antenna device.

As illustrated in FIG. 25, a full-wave rectifier circuit (including diodes 61 to 64 and Zener diodes 66 and 67) is connected to the antenna device 1, and an output voltage of the full-wave rectifier circuit can be measured by a high-resistance (2 MΩ or higher, desirably 10 MΩ) sensor, for example, a voltmeter 95. Furthermore, a battery 96 is charged via a backflow prevention diode 65 by the output of the full-wave rectifier circuit, and the output of the battery 96 is used as a power supply of the voltmeter 95.

By using a high resistance sensor, it is possible to measure the voltage induced in the metal. Then, by analyzing the acquired data, it is possible to acquire an operating status of a motor of a device, an inverter, and the like. As a result, the state of the device can be grasped, and an alert or the like can be issued before failure.

Figure 26:
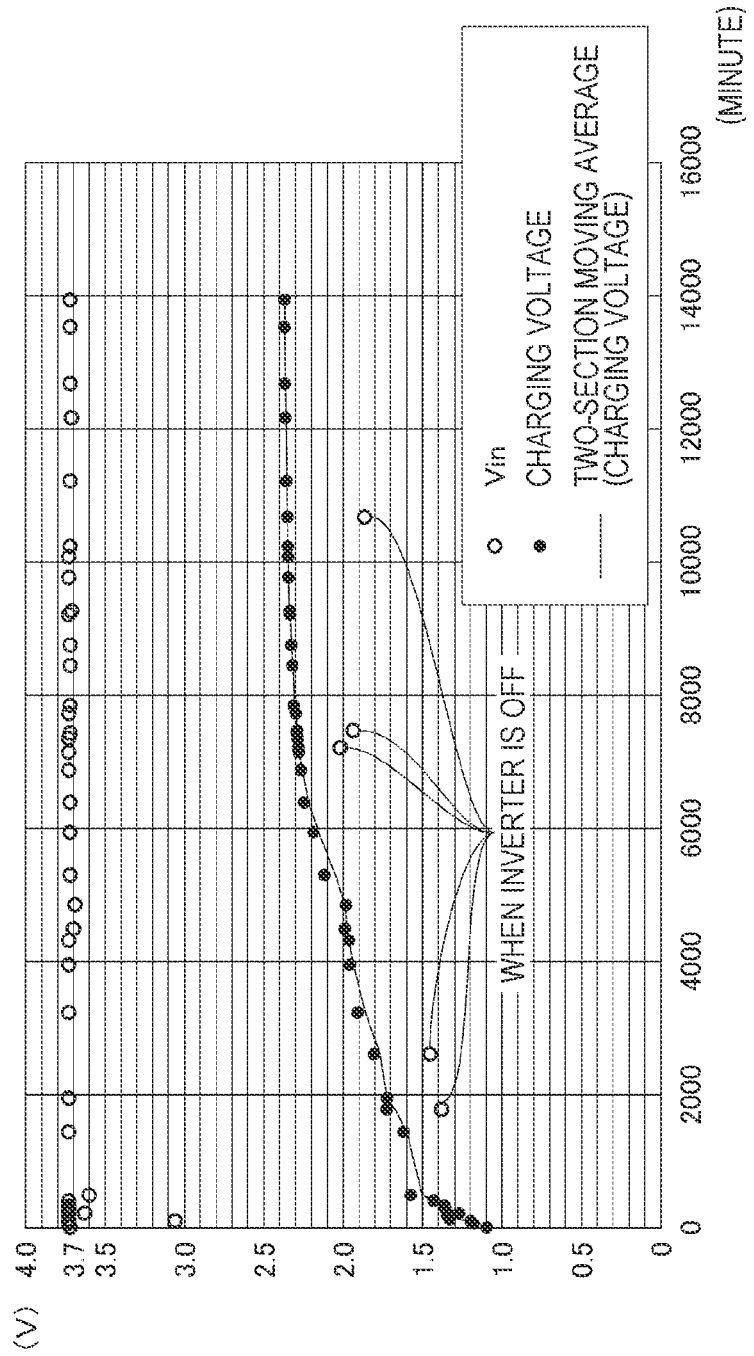
FIG. 26 is a graph used to describe an application example of the antenna device.

As an example, an experiment was conducted by attaching an antenna device to a side surface of a refrigerator. Using the generated power of 4.4 V, the voltage was stepped down from 3.7 V to 2.5 V using a step-down DC-DC converter to charge the battery. The results of checking the charging voltage and the input voltage at regular time intervals are illustrated in the graph of FIG. 26. It can be seen from this graph that the battery can be charged and the OFF timing of the inverter can be detected.

Figure 27A:
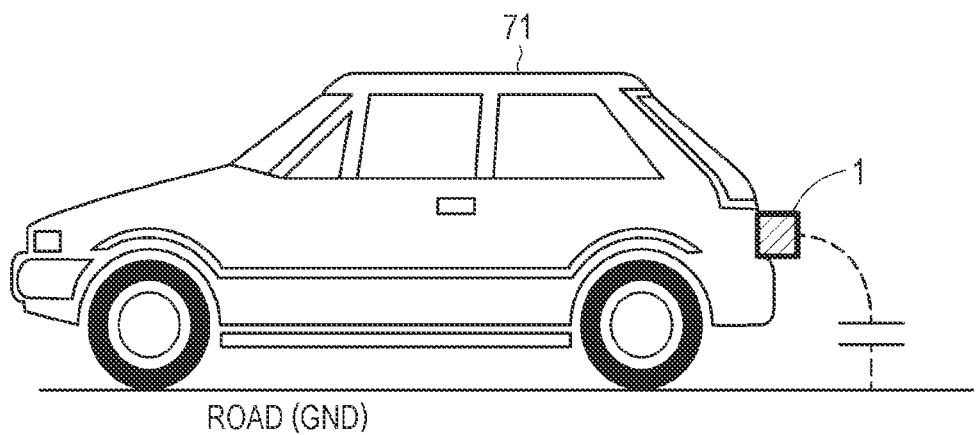
FIGS. 27A and 27B are schematic diagrams used for description of another embodiment in which the present technology is applied to a car.
Figure 27B:
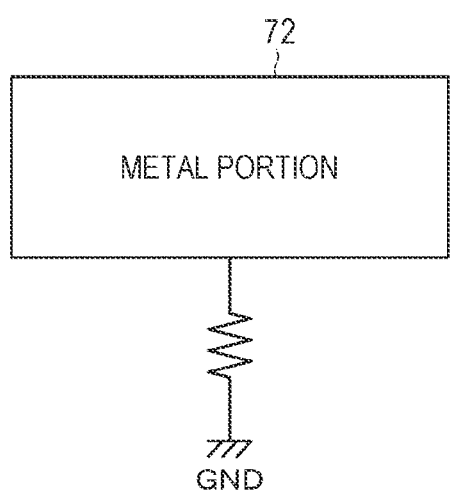
Figure 28:
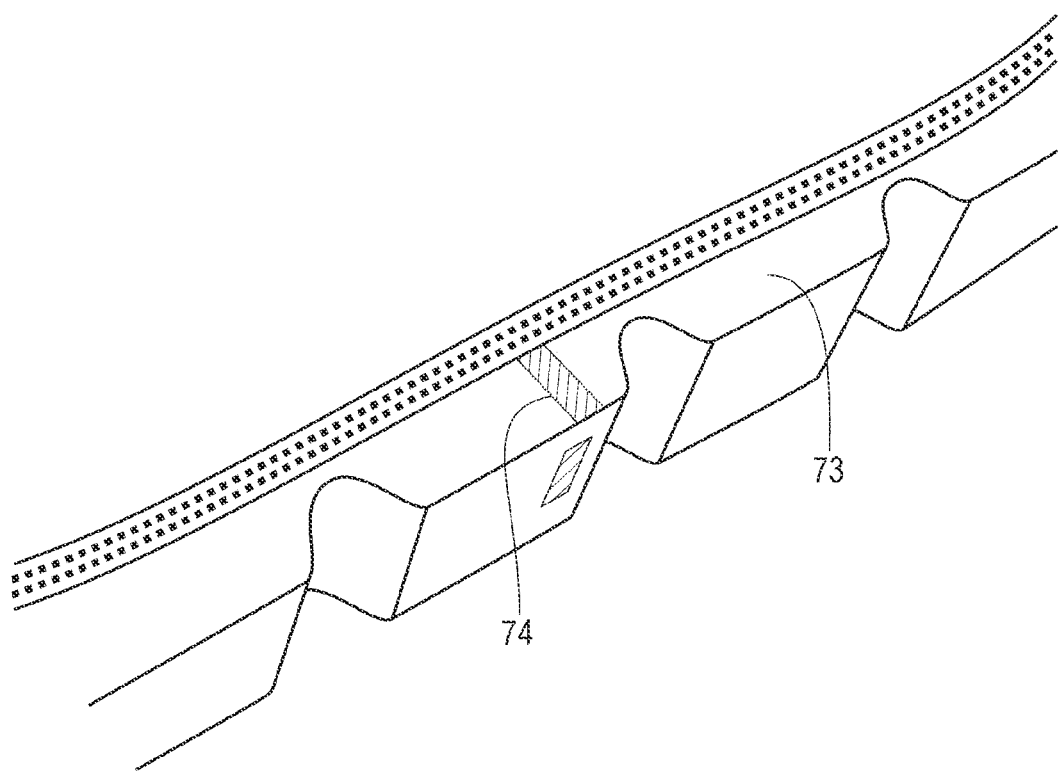
FIG. 28 is an enlarged perspective view illustrating a partial cross section of a tire.

Another embodiment of the present technology will be described with reference to FIGS. 27A, 27B, and 28. In another embodiment, the present technology is applied to a car (particularly, a vehicle body). As illustrated in FIG. 27A, in a state where the antenna device 1 (hatched portion) is attached to a car 71, in the configuration of FIGS. 5 and 7, it can be considered that the ground of the device board 12 or the separate second antenna element 20 and the earth ground are capacitively coupled to form a large antenna device 1. The antenna device 1 can take in the energy of the quasi-electrostatic field and the radio wave generated in the space including the reception of a low frequency quasi-electrostatic field.

In general, since a car (vehicle body) includes metal, static electricity is likely to be generated. Furthermore, recently, silica is mixed instead of conventional carbon in order to improve wear resistance of tires. Since silica does not conduct electricity, in order to release static electricity, measures are taken such as providing a conductive slit 74 (indicated by hatching) in a part of a tire 73 as illustrated in an enlarged cross section in FIG. 28. The conductive slit 74 releases generated static electricity. However, since the contact area of the conductive slit 74 with the earth is limited, the tire has a resistance value of about 10 MΩ. That is, the circuit configuration is grounded with a resistor as illustrated in FIG. 27B. Therefore, in a case of being viewed from the energy of the quasi-electrostatic field and the radio wave generated in the current target space, the car is floating in the space. Furthermore, even in a case where the car is not completely insulated from the earth, the metal portion (for example, the vehicle body) 72 and the earth may be coupled with an inductance component instead of resistance although FIG. 19B illustrates an example of resistance.

By using a large metal of the car as an antenna in this manner, it is possible to take in more energy of the quasi-electrostatic field and the radio wave generated in the space. If the energy taken in is rectified and stored in an energy storage device such as a secondary battery, it is not necessary to charge a position detection sensor or the like of a key of a car necessary for the car in the future.

In the present technology, the antenna includes metal such as a car, a vending machine, a refrigerator, a microwave oven, a metal rack, a guardrail, a mail post, a traffic light, and the like, and the antenna is made with a ground of a reception device or a separate antenna. Therefore, a receivable frequency is not limited by an antenna shape. Furthermore, by adopting a structure in which the ground of the reception device is capacitively coupled to the ground of the earth, it is possible to take in electric field energy in a quasi-electrostatic field other than radio waves. That is, power or noise leaking from a power cord and an inverter can be converted into energy. In this manner, the metal of the product can be treated as one antenna element, and the power induced by the metal of the product itself can be taken in as an antenna between the metal of the product and the ground of the reception device.

In a case where it is assumed that a microwave oven, a refrigerator, or the like in a room extracts power from a metal product that needs to be dropped to the ground as an electrostatic countermeasure, as illustrated in the examples of FIGS. 6, 8, 9, 10, and 11, an electrostatic protection component, for example, a varistor 21 is inserted between the microwave oven, the refrigerator, or the like and the antenna element 11 as an electrostatic countermeasure, and insulating covered cables 24, 25a, and 25b are connected via the ground 19 of the device or the antenna element 20 and grounded to the earth ground, so that the electrostatic countermeasure can be performed.

Moreover, in the example of FIG. 9, the antenna element 20 is connected to the ground of the earth via the insulating covered cable, so that it is possible to extract much larger power than the capacitive coupling. In a case where power is extracted from a metal portion of such a product, it is necessary to cope with the case by connecting the product with an insulating covered cable or the like as described above.

Although the embodiments of the present technology have been specifically described above, the present technology is not limited to the above-described embodiments, and various modifications based on the technical idea of the present technology can be made. Furthermore, one or a plurality of arbitrarily selected aspects can be appropriately combined. Furthermore, the configurations, methods, steps, shapes, materials, numerical values, and the like of the above-described embodiments can be combined with each other without departing from the gist of the present technology. For example, power generation using the present technology and natural energy, for example, solar power generation or a thermoelectric conversion element may be used in combination to store energy.

Next, as an application example of the reception device according to the embodiment and the like, the reception device can be used as a power supply device of an electronic device such as a temperature and humidity sensor or a car position detection sensor.

Figure 29:
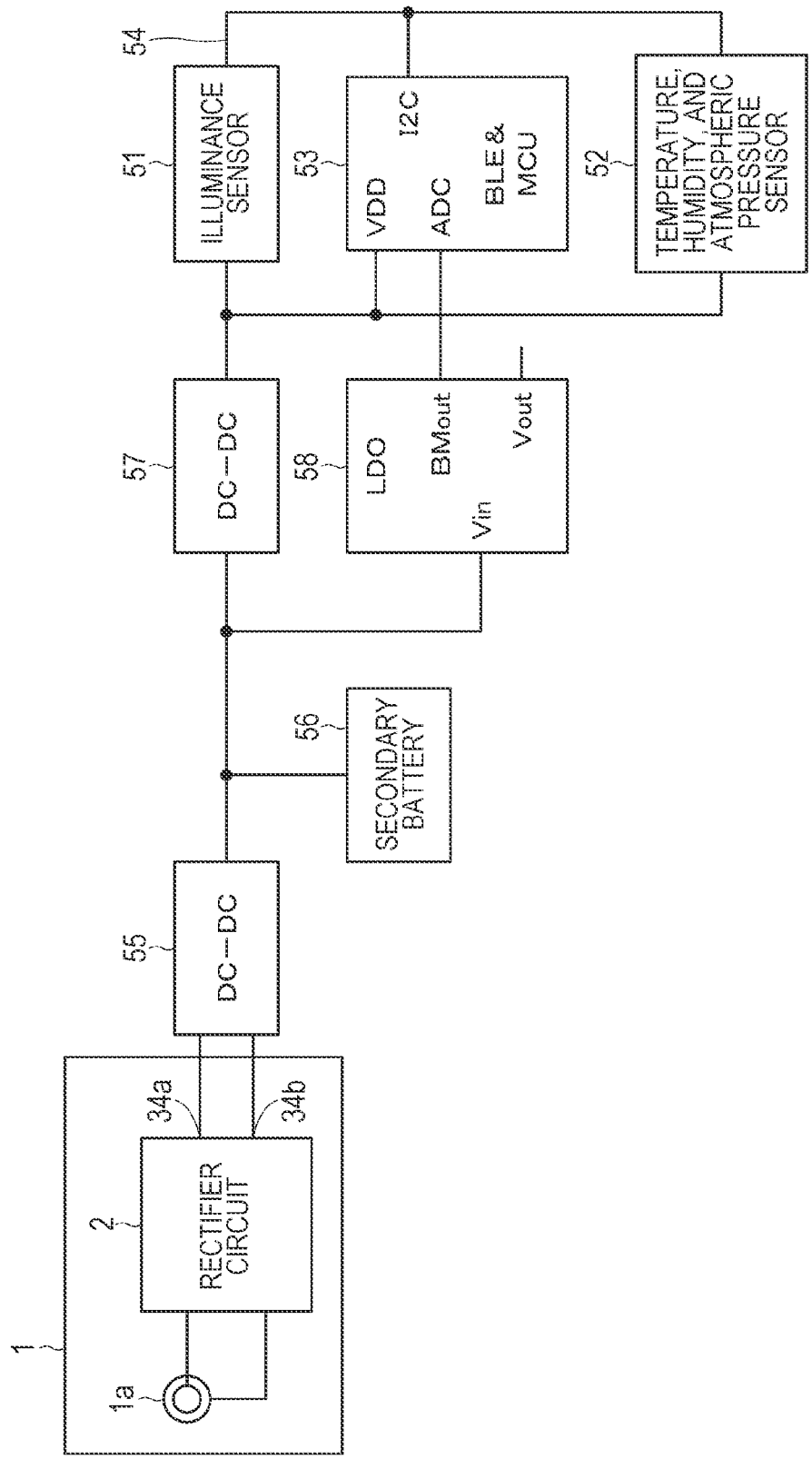
FIG. 29 is a block diagram illustrating a configuration of another application example of the present technology.

FIG. 29 is a block diagram illustrating an application example in which the present technology is applied to a power supply for Internet of Things (IoT) for environment monitoring or detection of a condition of a device. An illuminance sensor 51, a temperature, humidity, and atmospheric pressure sensor 52, and a Bluetooth (registered trademark) low energy (BLE) and Microcontroller unit (MCU) 53 are provided, and these blocks (ICs) are connected by an I2C bus 54. As a power supply for such IoT, the antenna device 1 (a configuration including the antenna unit 1a and the rectifier circuit 2 as illustrated in FIG. 6) according to the present technology is applied.

Note that in a case where the rectifier circuit 2 is, for example, a voltage doubler rectifier circuit using a capacitor, it is important that the leakage current of the diode at the time of reverse bias is very small. In a case where there is a leakage current, a full-wave rectifier circuit is suitable. For the diode characteristics, it is preferably that a large amount of current can flow from a voltage at which Vf is very small. In order to obtain a high voltage, it is desirable that the leakage current of the reverse voltage application board is very small. In the case of using a voltage quadrupler circuit or the like, the leakage current at this time needs to be about 0.001 μA when 5 V of the reverse voltage is applied.

Note that in a case where the rectifier circuit 2 is a voltage doubler rectifier circuit using a capacitor or more, it is important that the leakage current of the diode at the time of reverse bias is very small. In a case where there is a leakage current, a full-wave rectifier circuit is suitable. For the diode characteristics, it is preferably that a large amount of current can flow from a voltage at which Vf is very small. In order to obtain a high voltage, it is desirable that the leakage current of the reverse voltage application board is very small. In the case of using a voltage quadrupler circuit or the like, the leakage current at this time needs to be about 0.001 μA when 5 V of the reverse voltage is applied.

The BLE is one of extended specifications of Bluetooth (registered trademark), and can perform communication with extremely low power. Detection data of the illuminance sensor 51 and the temperature, humidity, and atmospheric pressure sensor 52 can be wirelessly transmitted to a mobile terminal such as a smartphone or a tablet, for example, by the BLE and MCU 53.

The output terminals 34a and 34b of the rectifier circuit 2 are connected to a DC-DC converter 55 as a charger. An energy storage device, for example, a lithium ion secondary battery 56 is charged by the output of the DC-DC converter 55. The output of the lithium ion secondary battery 56 is supplied to a DC-DC converter 57 and a low dropout (LDO) 58.

The output of the DC-DC converter 57 is supplied as a power supply to the illuminance sensor 51, the temperature, humidity, and atmospheric pressure sensor 52, and the BLE and MCU 53. Furthermore, the output of the LDO 58 is supplied to the BLE and MCU 53 as a power supply. The LDO is a linear regulator that operates even with a low potential difference between input and output, and is designed with less energy loss and suppressed heat generation and the like by operating with a low potential difference. The output is supplied to the AD conversion input of the BLE and MCU 53, and the output voltage of the secondary battery 56 is monitored by the BLE and MCU 53.

The antenna used for communication with the outside, such as the BLE described above or the like, desirably has a dipole structure that is an antenna configuration that does not use a ground of a circuit board that is hardly affected by energy harvesting.

When the power storage circuit unit described above is applied, it is also possible to charge a battery of a device that requires charging.

Note that, in a case of being used outdoors exposed to wind and rain, it is required to have waterproof and dripproof and weather resistance to ultraviolet rays and the like. In the configurations of FIGS. 2 and 3, the weather resistance of the antenna device 1 can be improved by coating the surfaces of the antenna element 11 and the case 17 or the cases 17A and 17B and the joint unit 22 in the case where the case is separated (FIG. 2C) with a resin having water resistance and light resistance.

Furthermore, the present technology takes in energy of an electric field induced in a metal portion of a device, but can also be used as a power receiving device for wireless power supply in a case where this effect is actively used.

Figure 30A:
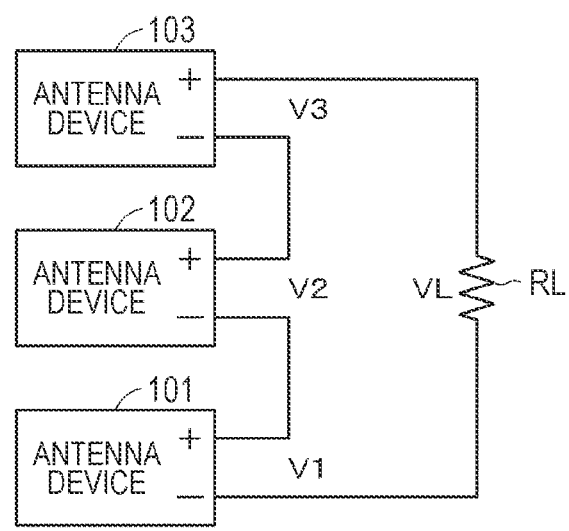
FIGS. 30A and 30B are block diagrams illustrating a general configuration for increasing output.
Figure 30B:
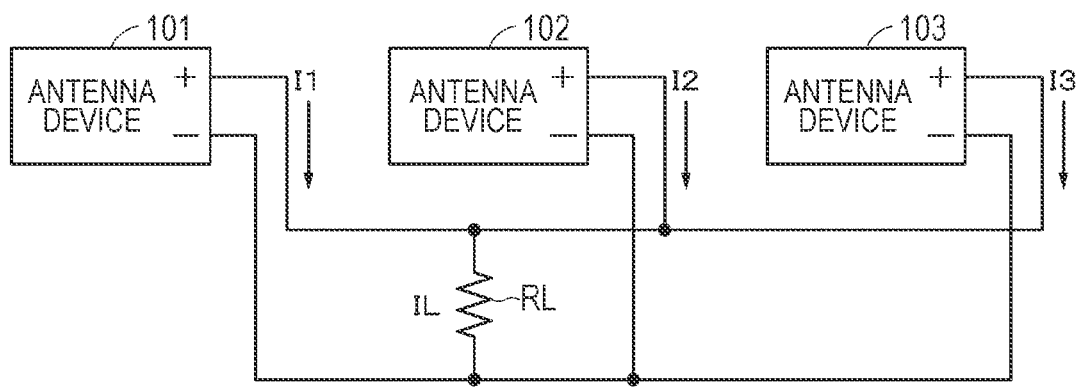

A general configuration for further increasing the output of the antenna device including the antenna unit 1a and the rectifier circuit 2 will be described with reference to FIGS. 30A and 30B. FIG. 30A illustrates a configuration in which antenna devices 101,102 and 103 are connected in series. The voltage VL applied to the load RL is (V1+V2+V3). FIG. 30B illustrates a configuration in which the antenna devices

101, 102 and 103 are connected in parallel. The current IL flowing through the load RL is (I1+I2+I3).

Figure 31:
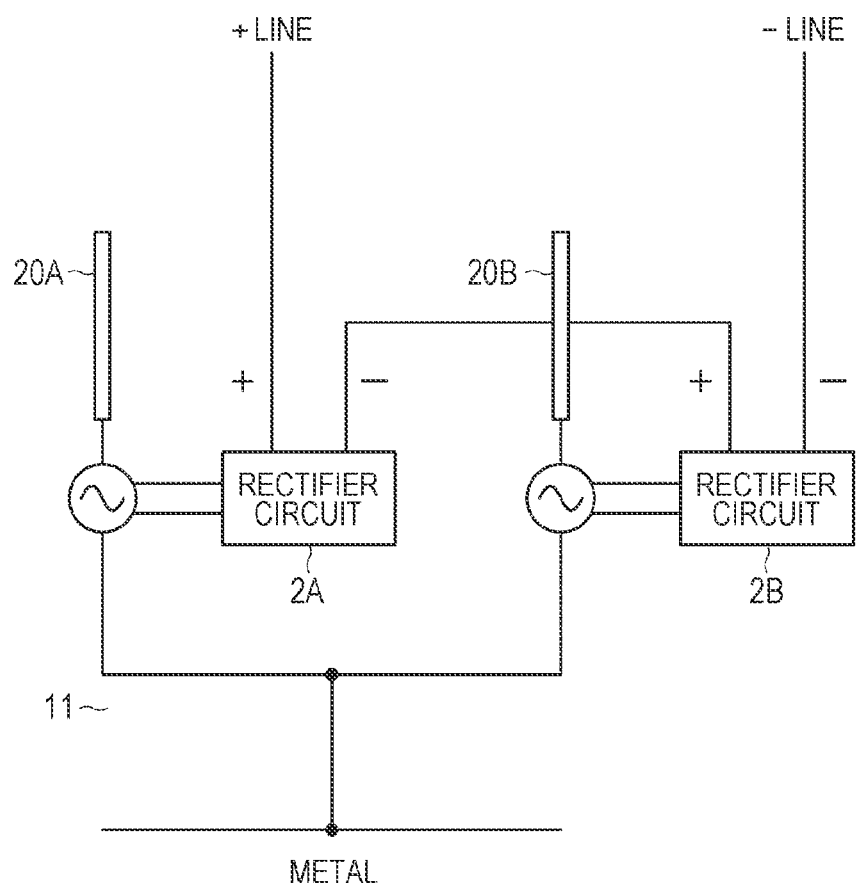
FIG. 31 is a block diagram of an example of a configuration in which antenna devices are connected in series.

FIG. 31 illustrates a first example for increasing the output voltage of the antenna device. A first antenna element 11 in contact with metal is provided, and two second antenna elements 20A and 20B are provided with respect to the antenna element 11. The antenna elements 20A and 20B are, for example, another independent board, housing, or the like. A rectifier circuit 2A that rectifies the output of the antenna unit including the antenna elements 11 and 20A is provided, and a rectifier circuit 2B that rectifies the output of the antenna unit including the antenna elements 11 and 20B is provided. The rectifier circuits 2A and 2B are connected in series, and an output line is derived from the series connection.

Figure 32:
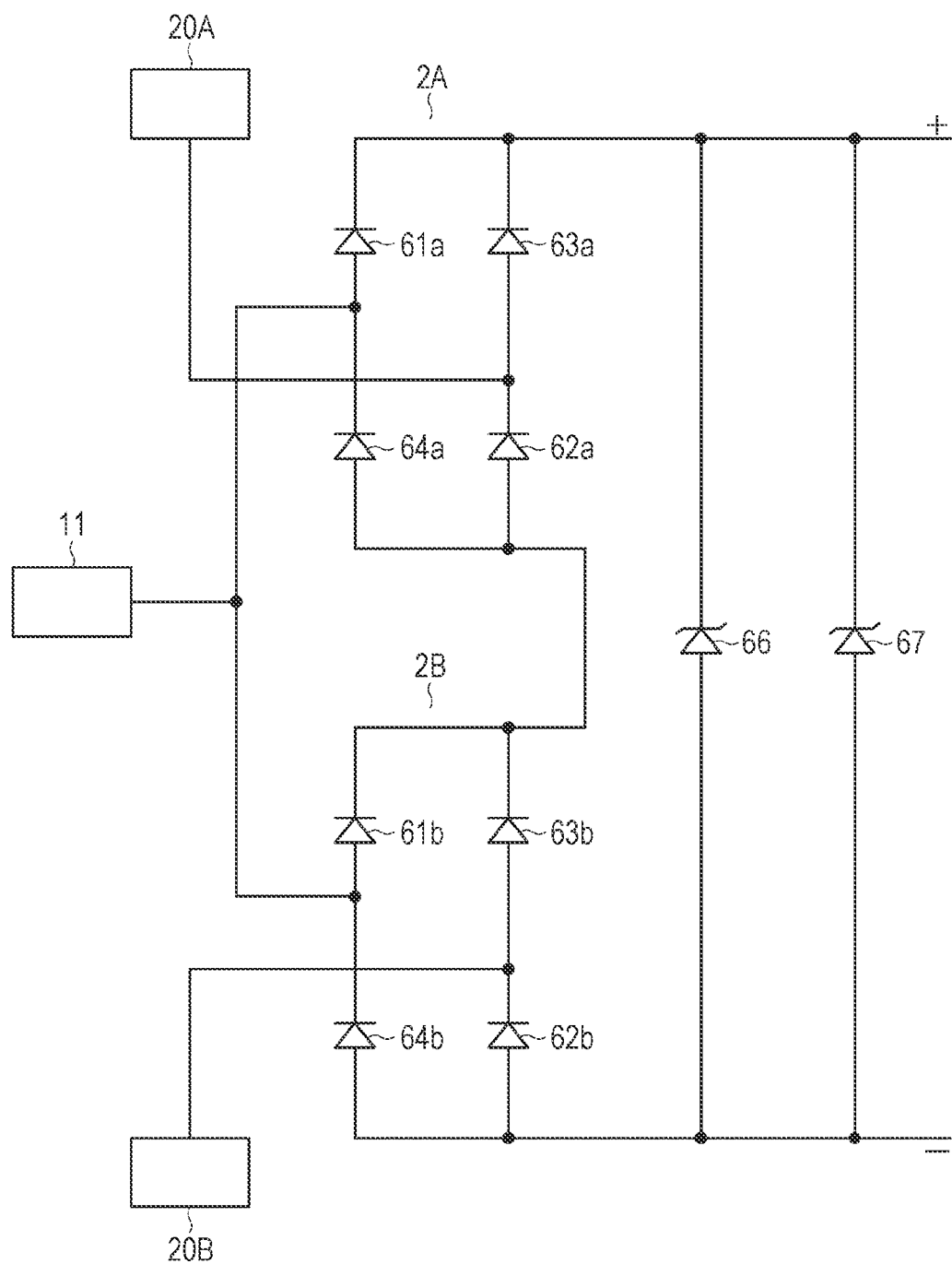
FIG. 32 is a connection diagram illustrating an example of circuit connection of FIG. 31.

FIG. 32 illustrates a circuit connection of a first example. This is an example in which a full-wave rectifier circuit is used as the rectifier circuits 2A and 2B connected in series. The Zener diodes 66 and 67 are elements common to the two rectifier circuits 2A and 2B.

According to the first example, for example, in a case where an output voltage of 4 V is obtained by one antenna device, an output voltage of 8 V can be obtained. A larger output voltage can be obtained by connecting two or more rectifier circuits in series. The first example has a configuration suitable for such a case because it is not necessary to consider a distance between antennas in a case where a frequency of power supply noise or the like that induces a voltage is low.

Figure 33:
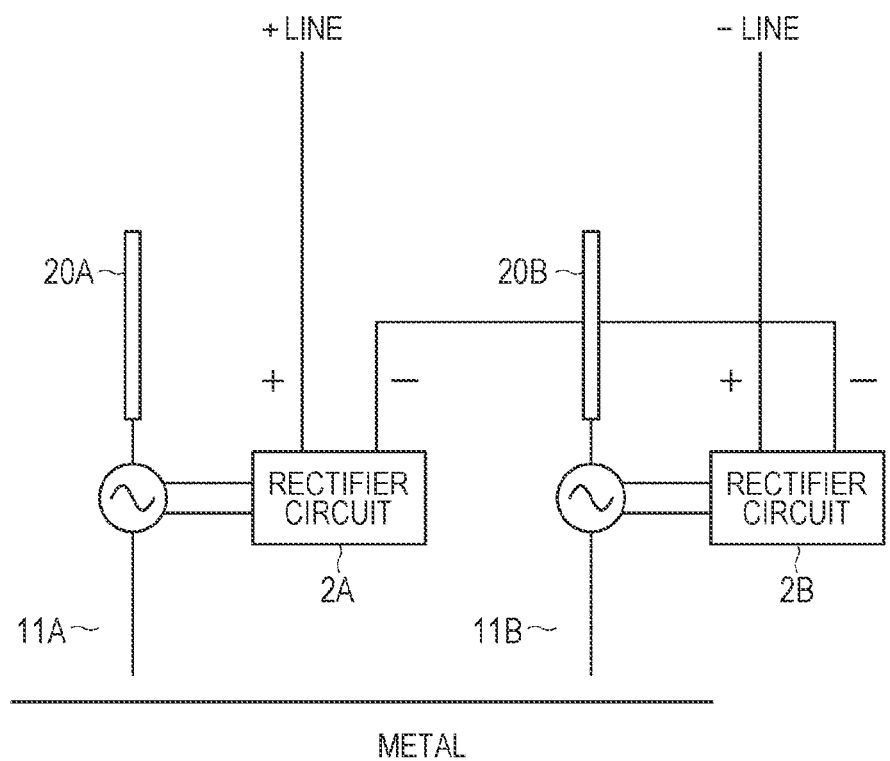
FIG. 33 is a block diagram of another example of the configuration in which the antenna devices are connected in series.
Figure 34:
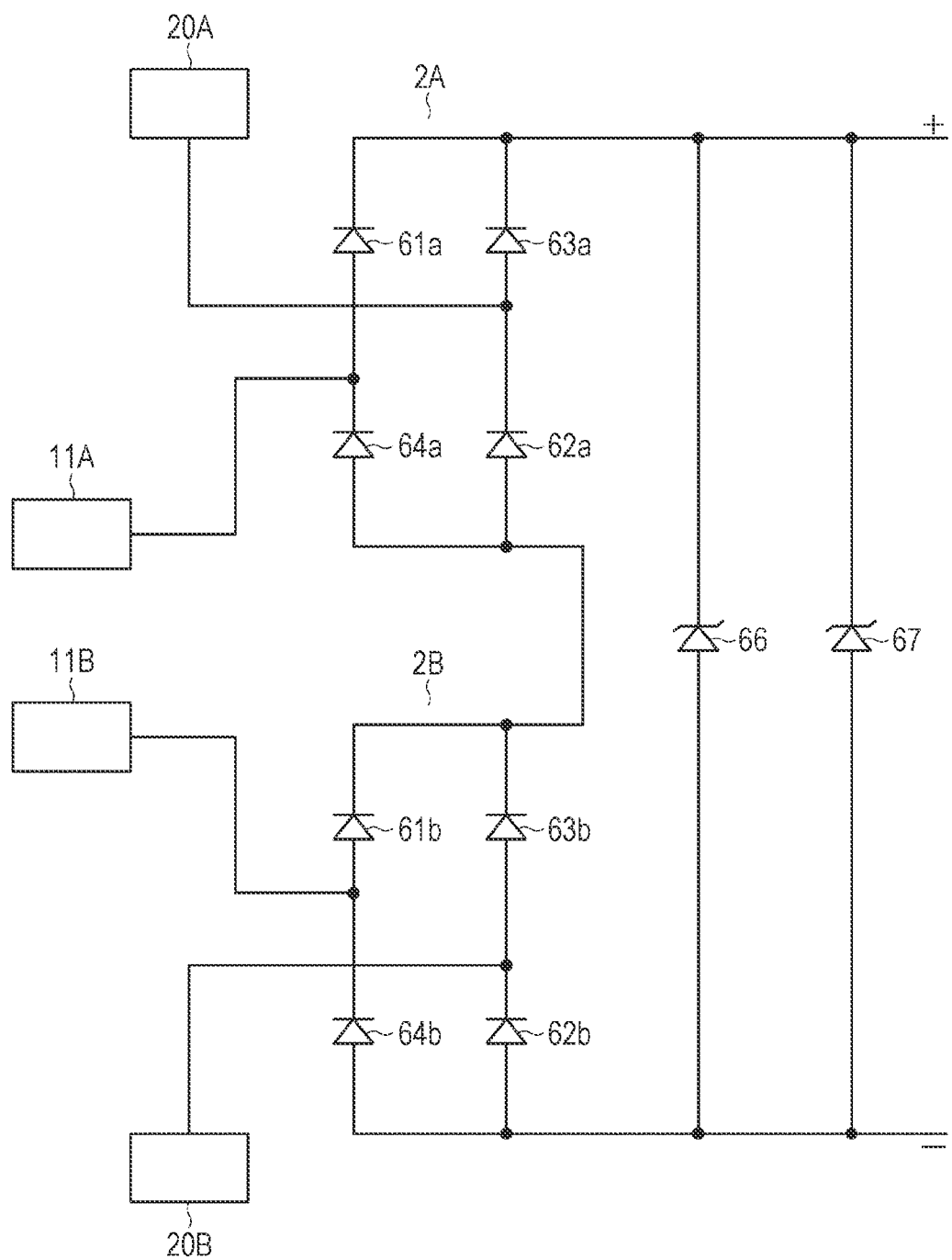
FIG. 34 is a connection diagram illustrating an example of circuit connection of FIG. 33.

In a second example, as illustrated in FIGS. 33 and 34, independent antenna elements 11A and 11B are provided as first antenna elements to be in contact with the metal. The antenna elements 11A and 11B are in contact with different parts of metal.

FIG. 34 illustrates a circuit connection of a second example. This is an example in which a full-wave rectifier circuit is used as the rectifier circuits 2A and 2B connected in series. The Zener diodes 66 and 67 are elements common to the two rectifier circuits 2A and 2B.

Figure 35:
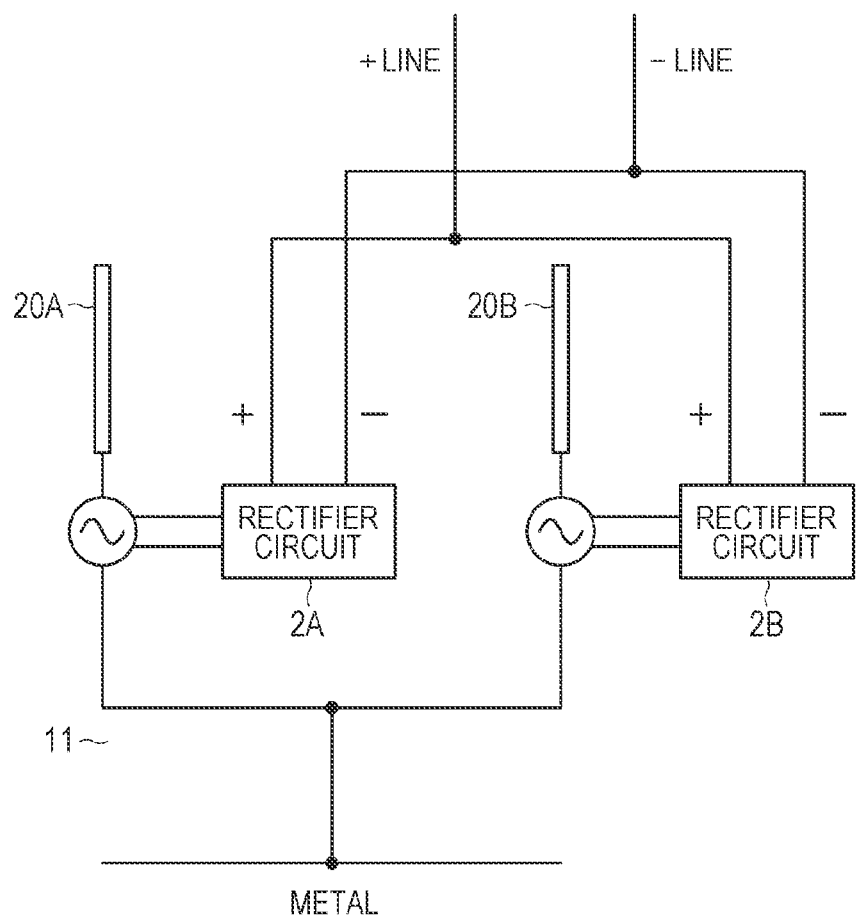
FIG. 35 is a block diagram of an example of a configuration in which antenna devices are connected in parallel.
Figure 36:
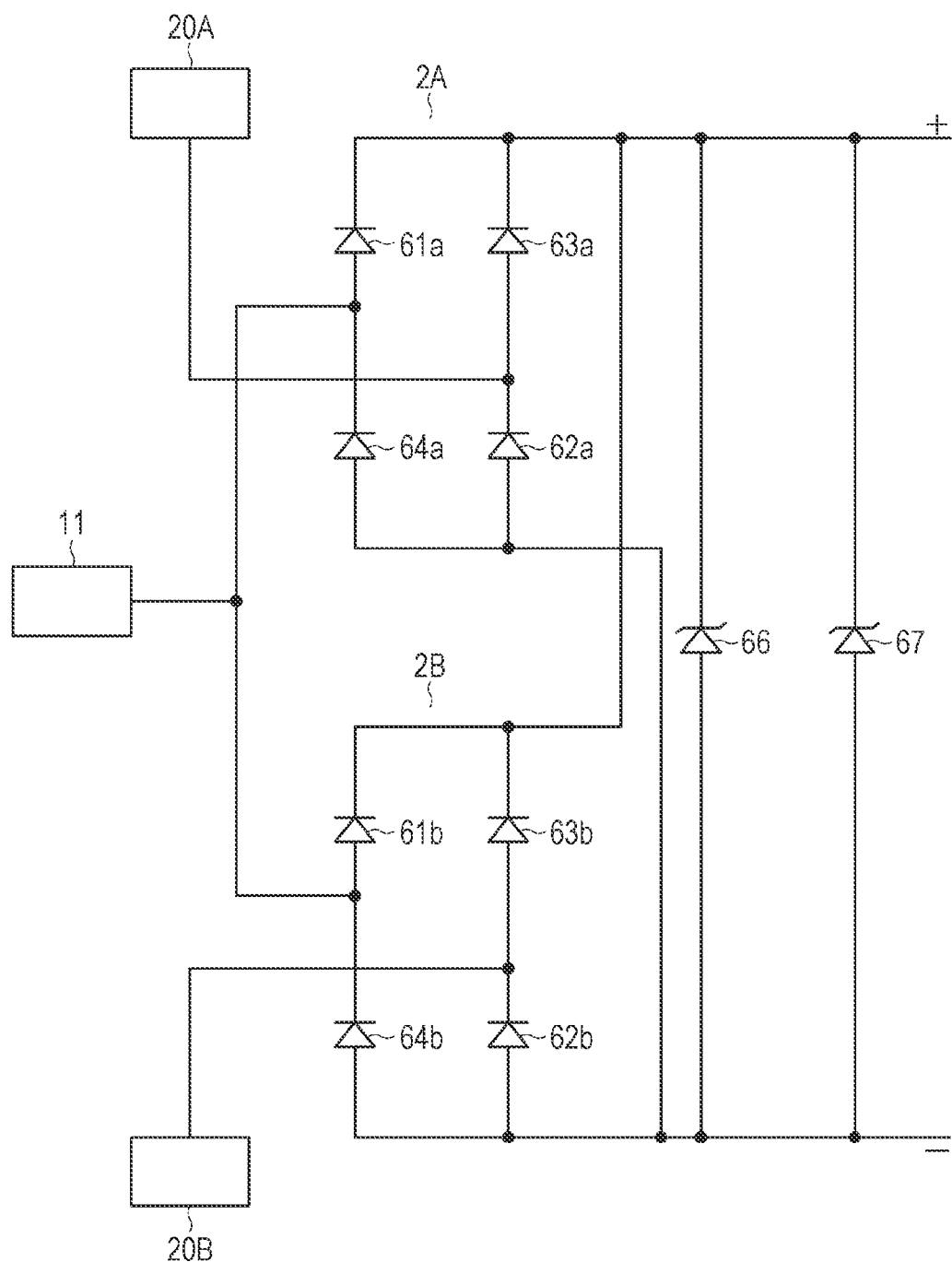
FIG. 36 is a connection diagram illustrating an example of circuit connection of FIG. 35.

FIGS. 35 and 36 illustrate a third example for increasing the output current of the antenna device. A first antenna element 11 in contact with metal is provided, and two second antenna elements 20A and 20B are provided with respect to the antenna element 11. The antenna elements 20A and 20B are, for example, another independent board, housing, or the like. A rectifier circuit 2A that rectifies the output of the antenna unit including the antenna elements 11 and 20A is provided, and a rectifier circuit 2B that rectifies the output of the antenna unit including the antenna elements 11 and 20B is provided. The rectifier circuits 2A and 2B are connected in parallel, and an output line is derived from the parallel connection.

FIG. 36 illustrates a circuit connection of a third example. This is an example in which a full-wave rectifier circuit is used as the rectifier circuits 2A and 2B connected in parallel. The Zener diodes 66 and 67 are elements common to the two rectifier circuits 2A and 2B.

Figure 37:
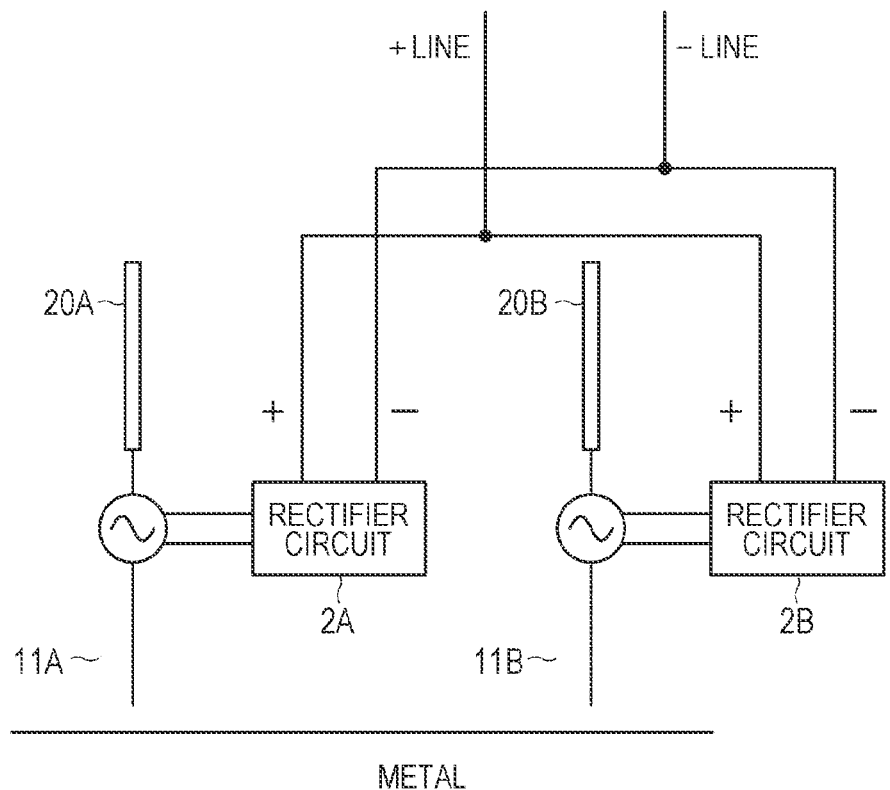
FIG. 37 is a block diagram of another example of the configuration in which the antenna devices are connected in parallel.
Figure 38:
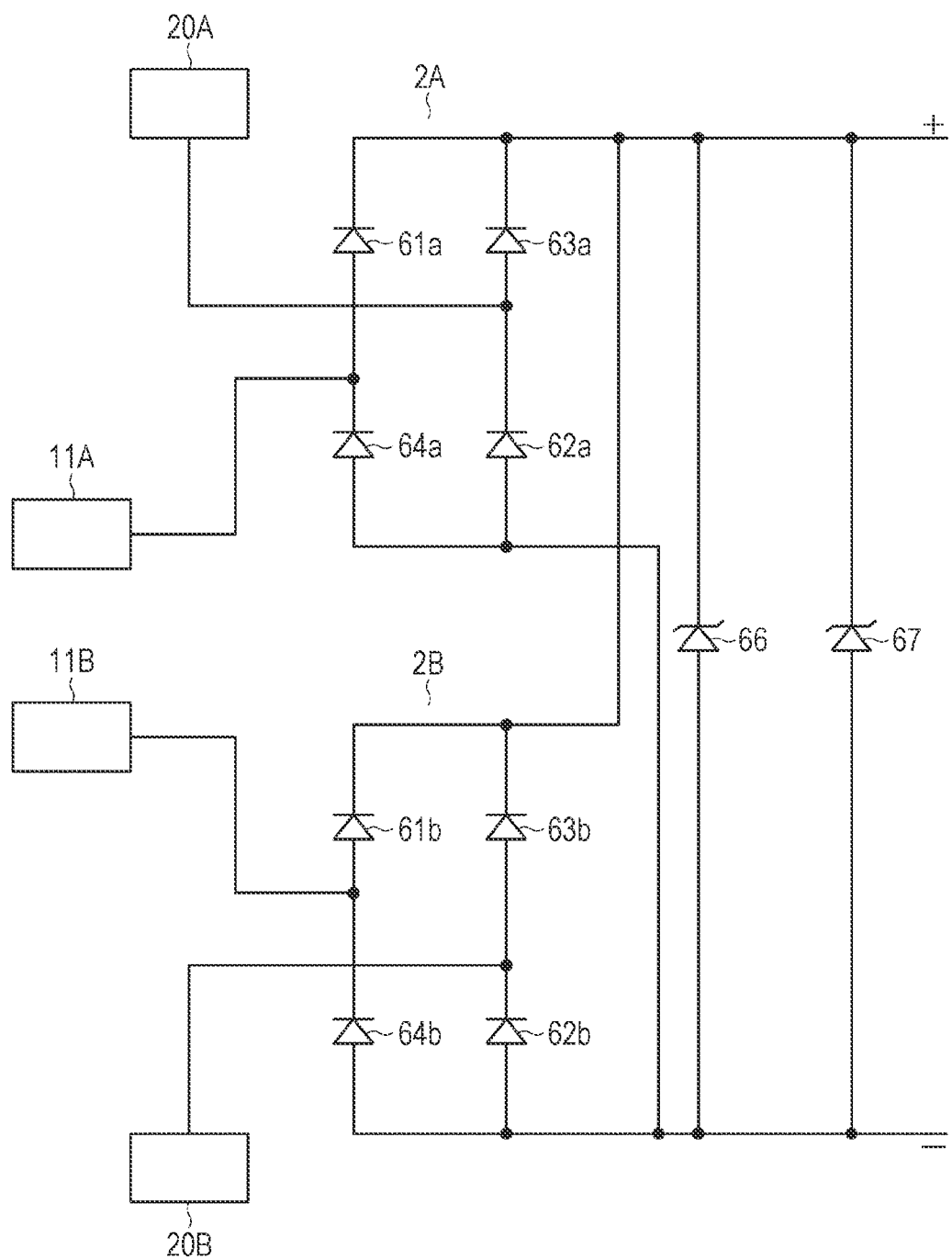
FIG. 38 is a connection diagram illustrating an example of circuit connection of FIG. 37.

In a fourth example, as illustrated in FIGS. 37 and 38, independent antenna elements 11A and 11B are provided as first antenna elements to be in contact with the metal. The antenna elements 11A and 11B are in contact with different parts of metal.

FIG. 38 illustrates a circuit connection of a fourth example. This is an example in which a full-wave rectifier circuit is used as the rectifier circuits 2A and 2B connected in parallel. The Zener diodes 66 and 67 are elements common to the two rectifier circuits 2A and 2B.

The above-described antenna elements 11, 11A, and 11B in contact with metal are connected to the connection point of the diodes 61a and 64a and the connection point of the diodes 61b and 64b, respectively, in order to have the same phase. Furthermore, the connection positions of the full-wave rectifier circuits are the same point.

The antenna element connected to the metal element is connected to a position at which the phases of the rectifier circuits are added in order to achieve the same phase.

Figure 39A:
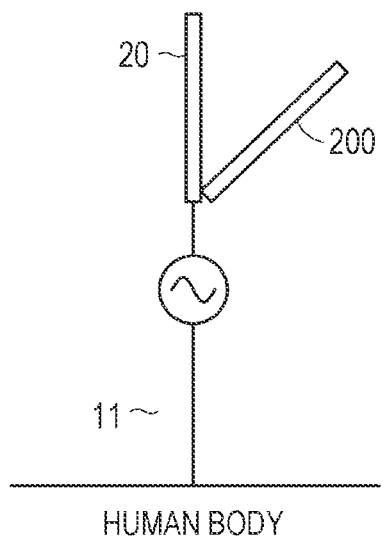
FIGS. 39A and 39B are schematic diagrams used for description in a case where the number of antennas is increased.
Figure 39B:
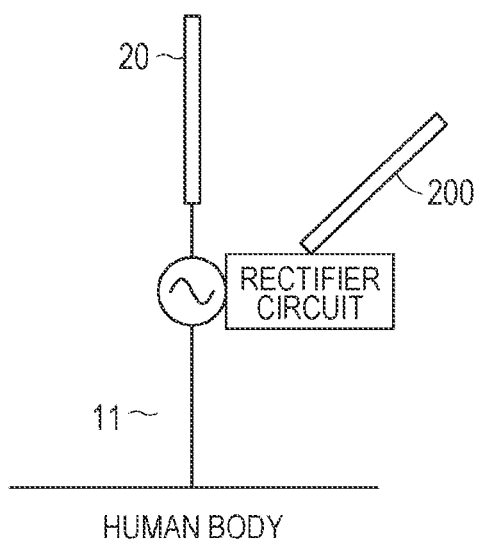
Figure 40A:
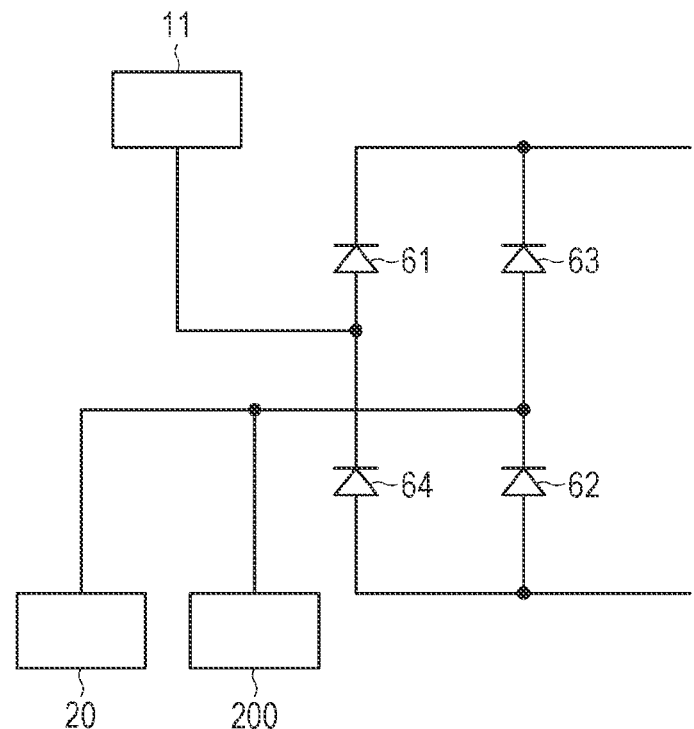
FIGS. 40A and 40B are connection diagrams used for description in a case where the number of antennas is increased.
Figure 40B:
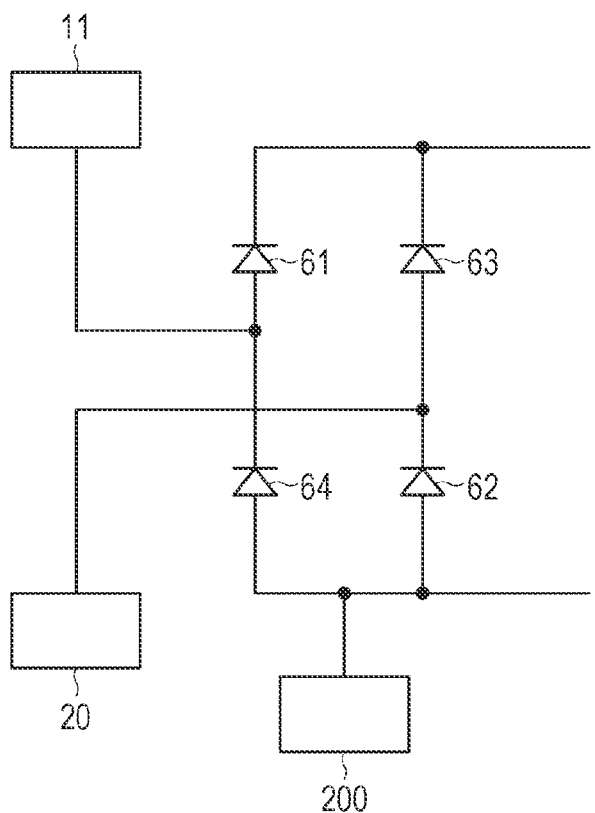

FIGS. 39A, 39B, 40A, and 40B illustrate examples in a case where the number of antennas is increased in the present technology. In a case where the number of antennas having the same length is increased, the voltage slightly decreases, but when it is desired to increase the current, the number of antenna elements may be increased. As illustrated in FIGS. 39A and 40A, the current can be increased by creating and connecting an antenna element 200 at the base of the antenna element 20. In a case where it is desired to increase the voltage and the current, the length of the antenna element is set to (length of antenna element 20<length of antenna element 200). Furthermore, as illustrated in FIGS. 39B and 40B, the antenna element 20 may be formed on a board on which a rectifier circuit is mounted, and the antenna element 200 may be separately formed by, for example, a board, a housing, a rod antenna, or the like.

As described above, in a case where an output current of, for example, 4 μA is obtained by one antenna device, an output current of 8 μA can be obtained by connecting parallel circuits. Furthermore, in a case where it is desired to increase the voltage, for example, in a case where it is desired to set the output of 4 V to the output of 8 V, it is possible by using a series circuit connection, In this manner, by combining the series and parallel circuits described above, it is possible to supply necessary power to the subsequent stage.

In the circuit configuration described above, a capacitor for smoothing a voltage after rectification may be connected in parallel to the Zener diode.

Note that the present technology can also have the following configurations.

(1)

An antenna device including an antenna unit including a rectifier circuit that receives electric field energy of a radio wave or a quasi-electrostatic field (near field) in a space and rectifies an AC signal into a direct current, the antenna unit including a first antenna element that is a conductor to be in contact with or connected to an industrial product metal portion and a second antenna element that is a conductor different from the first antenna element and provided not to be electrically connected to the industrial product metal portion, in which an input line output from the first antenna element to a rectifier circuit unit of the AC signal output from the antenna unit is connected to the rectifier circuit.

(2)

The antenna device according to (1), in which the input line is connected in series to the rectifier circuit.

(3)

The antenna device according to (1) or (2), in which the second antenna element and a ground of an earth are capacitively coupled to each other.

(4)

The antenna device according to (1) or (2), in which the second antenna element is grounded to an earth ground.

(5)

The antenna device according to (1), in which a contact surface of the first antenna element with the industrial product metal portion includes a conductor electrode including any one or a combination of gold, silver, aluminum, copper, iron, nickel, or an alloy.

(6)
The antenna device according to (5), in which a contact surface of the first antenna element with the industrial product metal portion is in contact with the industrial product metal portion by any one or a combination of caulking and pressure welding.

(7)
The antenna device according to (5), in which the conductor electrode is coated with a resin.

(8)
The antenna device according to (1), in which a connection unit of the first antenna element with the industrial product metal portion includes a conductor electrode including any one or a combination of gold, silver, aluminum, copper, iron, nickel, or an alloy.

(9)
The antenna device according to 8, in which the connection units are connected by any one or a combination of screwing, soldering, welding, conductive resin, conductive tape, conductive rubber, and magnet.

(10)
The antenna device according to (5), in which the conductor electrode has any one or a combination of a pin shape, a linear shape, a hemispherical shape, an uneven shape, and a planar shape.

(11)
The antenna device according to (1), in which the second antenna element includes metal such as copper or the like, and includes any one or a combination of a ground of a circuit board of a receiver, a pattern different from the ground on a board, a receiver housing metal not electrically connected to the industrial product metal portion, and a conductor cable.

(12)
The antenna device according to (1), in which the second antenna element according to (1) and an earth ground are directly or indirectly grounded using an insulating covered cable or the like.

(13)
The antenna device according to (1), in which the antenna device is grounded from the first antenna element connected to the metal portion via an electrostatic protection component.

(14)
The antenna device according to (1), in which the antenna device is grounded to a ground from the first antenna element via an electrostatic protection component using an insulating covered cable.

(15)
The antenna device according to (1), further including a separation circuit that frequency-separates the AC signal input from the antenna unit; and a plurality of rectifier circuits that rectifies the AC signal separated by the separation circuit.

(16)
The antenna device according to (1), in which a contact surface of the industrial product metal portion other than a contact unit or the connection unit is housed in a case including an insulating material.

(17)
An antenna device including a rectifier circuit in which a ratio of a forward current when a forward voltage of a diode for rectification is applied and a reverse current when a voltage is applied in a reverse direction is at least 4700 times or more.

(18)
An antenna device including a rectifier circuit in which a resistance value obtained using a reverse current when 10 V is applied in a reverse direction of a diode for rectification is 1.4 MΩ or more.

(19)
The antenna device according to (17), in which the antenna device takes in electric field energy of a radio wave and/or a quasi-electrostatic field (near field) in a space.

(20)
A rectifier circuit, in which the diode used in (17) includes silicon.

(21)
An electronic device including:
an antenna device including an antenna unit including a rectifier circuit that receives electric field energy of a radio wave or a quasi-electrostatic field (near field) in a space and rectifies an AC signal into a direct current, the antenna unit including a first antenna element that is a conductor to be in contact with or connected to an industrial product metal portion and a second antenna element that is a conductor different from the first antenna element and provided not to be electrically connected to the industrial product metal portion, in which an input line output from the first antenna element to a rectifier circuit unit of the AC signal output from the antenna unit is connected to the rectifier circuit; an energy storage device charged by an output of the rectifier circuit; and
a communication unit that uses an output of the energy storage device as a power supply.

REFERENCE SIGNS LIST

1 Antenna device
2, 2a, 2b Rectifier circuit
4 Energy storage device
7 Diplexer
11 Antenna element
12 Device board
15 Feeding point
91 Metal rack
71 Car

What is claimed is:
1. An antenna device, comprising:
an antenna unit including a first antenna element and a second antenna element; and
a rectifier circuit, wherein the rectifier circuit:
receives an output of the antenna unit, the output of the antenna unit comprising electric field energy of a radio wave or a quasi-electrostatic field (near field) in a space, and
rectifies the output of the antenna unit into a direct current, wherein:
the first antenna element is a conductor to be in contact with or connected to an industrial product metal portion,
the second antenna element is a conductor different from the first antenna element and provided not to be electrically connected to the industrial product metal portion, and
an input line connects the first antenna element to the rectifier circuit.
2. The antenna device according to claim 1, wherein the input line is connected in series to the rectifier circuit.

3. The antenna device according to claim 1, wherein the second antenna element and an earth ground are capacitively coupled to each other.

4. The antenna device according to claim 1, wherein the second antenna element is grounded to an earth ground.

5. The antenna device according to claim 1, wherein a contact surface of the first antenna element with the industrial product metal portion includes a conductor electrode including any one or a combination of gold, silver, aluminum, copper, iron, nickel, or an alloy.

6. The antenna device according to claim 5, wherein a contact surface of the first antenna element with the industrial product metal portion is in contact with the industrial product metal portion by any one or a combination of caulking and pressure welding.

7. The antenna device according to claim 5, wherein the conductor electrode is coated with a resin.

8. The antenna device according to claim 1, wherein the first antenna element is connected with the industrial product metal portion via a connection unit comprising a conductor electrode including any one or a combination of gold, silver, aluminum, copper, iron, nickel, or an alloy.

9. The antenna device according to claim 8, wherein the connection unit connects the first antenna element with the industrial product metal portion by any one or a combination of screwing, soldering, welding, conductive resin, conductive tape, conductive rubber, and magnet.

10. The antenna device according to claim 5, wherein the conductor electrode has any one or a combination of a pin shape, a linear shape, a hemispherical shape, an uneven shape, and a planar shape.

11. The antenna device according to claim 1, wherein the second antenna element includes any one or a combination of a ground of a circuit board of a receiver, a pattern different from the ground on the board, a receiver housing metal not electrically connected to the industrial product metal portion, and a conductor cable.

12. The antenna device according to claim 1, wherein the second antenna element and an earth ground are directly or indirectly grounded using an insulating covered cable or the like.

13. The antenna device according to claim 1, wherein the antenna device is grounded from the first antenna element connected to the industrial product metal portion via an electrostatic protection component.

14. The antenna device according to claim 1, wherein the antenna device is grounded to a ground from the first antenna element via an electrostatic protection component using an insulating covered cable.

15. The antenna device according to claim 1, further comprising a separation circuit that frequency-separates the output of the antenna unit; and a plurality of rectifier circuits that rectifies the output of the antenna unit frequency-separated by the separation circuit.

16. The antenna device according to claim 1, wherein a contact surface of the industrial product metal portion is housed in a case including an insulating material.

17. The antenna device according to claim 1, wherein a ratio of a forward current when a forward voltage of a diode for rectification is applied to the rectification circuit and a reverse current when a voltage is applied to the rectification circuit in a reverse direction is at least 4700 times.

18. The antenna device according to claim 1, wherein a resistance value obtained using a reverse current when 10 V is applied in a reverse direction of a diode for rectification is 1.4 MΩ or more.

19. The antenna device according to claim 17, wherein the antenna device takes in electric field energy of a radio wave and/or a quasi-electrostatic field (near field) in a space.

20. A rectifier circuit, wherein the diode used in claim 17 includes silicon.

21. An electronic device comprising:
an antenna device including an antenna unit and a rectifier circuit;
an energy storage device charged by an output of the rectifier circuit; and
a communication unit that uses an output of the energy storage device as a power supply,
wherein:
the rectifier circuit receives an output of the antenna unit, the output of the antenna unit comprising electric field energy of a radio wave or a quasi-electrostatic field (near field) in a space, and rectifies the output of the antenna unit into a direct current,
the antenna unit includes a first antenna element that is a conductor to be in contact with or connected to an industrial product metal portion and a second antenna element that is a conductor different from the first antenna element and provided not to be electrically connected to the industrial product metal portion, and
an input line connects the first antenna element to the rectifier circuit.

* * * * *